United States Patent
Cronkhite et al.

(10) Patent No.: US 12,236,793 B2
(45) Date of Patent: Feb. 25, 2025

(54) MODIFYING A FLIGHT PLAN FOR INSPECTING PROPERTIES BASED ON WEATHER EVENTS

(71) Applicant: Skydio, Inc., San Mateo, CA (US)

(72) Inventors: Caity Cronkhite, San Francisco, CA (US); Brent Davidson, San Francisco, CA (US); Kartik Ghorakavi, San Francisco, CA (US); Lauren Gimmillaro, San Francisco, CA (US); Edward Dale Steakley, Cupertino, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/328,455

(22) Filed: Jun. 2, 2023

(65) Prior Publication Data
US 2023/0394982 A1  Dec. 7, 2023

Related U.S. Application Data

(63) Continuation of application No. 15/852,504, filed on Dec. 22, 2017, now Pat. No. 11,705,010.

(60) Provisional application No. 62/440,224, filed on Dec. 29, 2016.

(51) Int. Cl.
| | |
|---|---|
| *G08G 5/00* | (2006.01) |
| *B64U 10/13* | (2023.01) |
| *B64U 101/30* | (2023.01) |
| *G06V 20/00* | (2022.01) |

(52) U.S. Cl.
CPC ........... *G08G 5/0069* (2013.01); *G06V 20/39* (2022.01); *G08G 5/0013* (2013.01); *G08G 5/0026* (2013.01); *G08G 5/003* (2013.01); *G08G 5/0034* (2013.01); *G08G 5/006* (2013.01); *G08G 5/0086* (2013.01); *B64U 10/13* (2023.01); *B64U 2101/30* (2023.01); *B64U 2201/104* (2023.01)

(58) Field of Classification Search
CPC .. G08G 5/0069; G08G 5/0026; G08G 5/0013; G08G 5/0086; G08G 5/0034; G08G 5/003; G08G 5/006; G06K 9/00704; G06K 9/0063; B64C 39/024; B64C 2201/123; B64C 2201/145; B64C 2201/127; B64U 2101/30
See application file for complete search history.

(56) References Cited

U.S. PATENT DOCUMENTS

| | | |
|---|---|---|
| 8,280,633 B1 | 10/2012 | Eldering et al. |
| 8,346,578 B1 | 1/2013 | Hopkins, III et al. |
| 9,609,288 B1 | 3/2017 | Richman et al. |

(Continued)

*Primary Examiner* — Ian Jen
*Assistant Examiner* — Renee LaRose

(57) ABSTRACT

A property is identified for inspection based on a determination of a weather event impacting the property. A flight plan usable by an unmanned aerial vehicle (UAV) in identifying an extent of damage to the property caused by the weather event is determined. A user interface is presented at a user device. The user interface includes user interface controls configured for toggling layers of the user interface. The layers include a first layer that includes a geofence, a second layer that includes an inspection area of the property, a third layer that includes one of a launch location or a landing location of the UAV, and a fourth layer that includes a base map layer of an area that includes the property. A modification to the flight plan is received via the user interface.

30 Claims, 12 Drawing Sheets

(56) References Cited

U.S. PATENT DOCUMENTS

| | | | |
|---|---|---|---|
| 2013/0317865 A1* | 11/2013 | Tofte | G06Q 10/06 |
| | | | 705/4 |
| 2014/0245210 A1* | 8/2014 | Battcher | G01S 13/95 |
| | | | 715/771 |
| 2016/0307447 A1* | 10/2016 | Johnson | H04W 4/021 |
| 2016/0343093 A1 | 11/2016 | Riland et al. | |
| 2016/0364989 A1 | 12/2016 | Speasl et al. | |
| 2017/0092109 A1 | 3/2017 | Trundle et al. | |
| 2017/0349279 A1* | 12/2017 | Garcia-Gabin | G01N 21/88 |

\* cited by examiner

MODIFYING A FLIGHT PLAN FOR INSPECTING PROPERTIES BASED ON WEATHER EVENTS

CROSS-REFERENCE TO RELATED APPLICATION(S)

This application is a continuation of U.S. patent application Ser. No. 15/852,504, filed Dec. 22, 2017, which claims the benefit of U.S. Provisional Patent Application No. 62/440,224, filed Dec. 29, 2016, the entire disclosures of which are hereby incorporated by reference.

BACKGROUND

Performing inspections of properties, such as buildings, homes, and so on, after significant weather events (e.g., storms, hail, tornados) can involve inspectors traveling to potentially affected properties and performing a series of time-consuming and complicated steps to fully inspect each potentially affected property. Generally, inspectors may need to perform disparate steps, which may not overlap, to perform different types of inspections (e.g., inspecting for hail damage, inspecting for earthquake damage, and so on). Additionally, these inspections can be preferred to take place rapidly after the significant weather event, for example so that any identified damage can be more easily established as being attributable to the weather event.

SUMMARY

Particular embodiments of the subject matter described in this specification can be implemented so as to realize one or more of the following advantages. A system can determine, or monitor, information indicating upcoming or presently occurring environmental and/or weather events, such as storms, hail, tornadoes, rain, wind, earthquakes, and so on. Subsequent to a weather event, the system can trigger unmanned aerial vehicle (UAV) inspections of affected properties (e.g., properties known to be, or likely to be, affected, such as negatively affected and/or damaged). The system can enable the rapid deployment of UAVs to cover large areas, and optionally in combination with on the ground operators, can reduce complexities associated with inspecting properties. As will be described, the system can pre-emptively generate jobs to be implemented by UAVs, with each job being associated with an inspection of one or more properties. In this way, subsequent to the weather event, the generated jobs can be assigned for implementation to (1) particular UAVs and/or (2) particular operators, thus enabling an inspection company a 'one-click' implementation of multitudes of inspections of properties through automated triggering of the system.

The features described in this specification solve and address numerous technical problems associated with inspecting properties for damage. As will be described, through use of UAVs, inspections can be completed in significantly shorter periods of time, and through technical refinements of computer vision processes, estimations of properties likely to be affected by particular weather events, real-time information obtained from flying UAVs, and so on, inspections can be assured to be more accurate. For example, machine learning systems that utilize computer vision can be enhanced through use of images obtained by UAVs as training data.

Furthermore, unnecessary inspections of properties can be avoided. As an example, a UAV performing an inspection of properties in a particular area can determine an extent to which a weather event is affecting the properties, and the system can limit, or include additional, inspections of other areas based on the determined extent. As an example, a UAV may actively determine that damage is decreasing, or is entirely absent, as the UAV navigates along a particular direction, and the system can determine that properties further along the particular direction are not in need of inspection. Thus, the techniques can enable conservation of resources (e.g., UAV availability), reduce complexities associated with generating flight plans, and so on. Additionally, UAVs can include or carry payload modules, such as sensors of differing types (e.g., visual cameras, infra-red cameras, ultraviolet cameras, distance measuring sensors, and so on), and can perform a multitude of differing types of inspections at a same time. In this way, a number of UAVs required can be reduced, thus enhancing efficiency of each inspection.

Furthermore, the system can access information received from specialized hardware, such as sensors or weather devices, located on properties to determine whether properties are to be inspected. For example, a small, low cost, and limited complexity, specialized piece of hardware may be installed on each property and may connect to the system via a network, such as the Internet. The hardware can then monitor weather events such as pressure, temperature, and so on. The system can additionally access information indicating reduction(s) in efficiencies of solar panels (e.g., solar collectors, particular solar cells, may be damaged during a weather event reducing historical efficiencies), and the system can utilize the accessed information to inform whether particular properties are to be inspected. In this way, the system can have access to specialized sensor information distributed across large areas, and can correlate the distributed sensor information to refine estimates of a weather event's course. As an example, a governmental organization may utilize machine-learning techniques to estimate an area that a weather event is likely to affect. The system can increase an accuracy associated with this estimation based on the specialized sensor information.

The system can reduce complexities associated with maintaining and operating fleets of UAVs, and can limit an extent to which flight plans are required to be manually defined. Thus, the system can reduce processing associated with generating flight plans for UAVs. The system can further limit errors associated with less sophisticated manual-based processes. Additionally, technical burden can be reduced with respect to ensuring people (e.g., employees) are trained to operate different software and hardware systems which can implement UAV fleet management, flight plan generation, operator assignment, and so on. As described above, the system democratizes use of UAVs, for example with respect to inspection purposes, through off-loading complex user required actions to be automatically performed. For example, the system can automatically monitor weather events, determine likelihoods of weather events affecting specific properties, optionally generate notifications to users (e.g., property owners) to determine if they were affected, generate and store job information associated with flight plans, and/or assign job information to operators.

The details of one or more embodiments of the subject matter of this specification are set forth in the accompanying drawings and the description below. Other features, aspects, and advantages of the subject matter will become apparent from the description, the drawings, and from the claims.

DETAILED DESCRIPTION

Figure 1A:
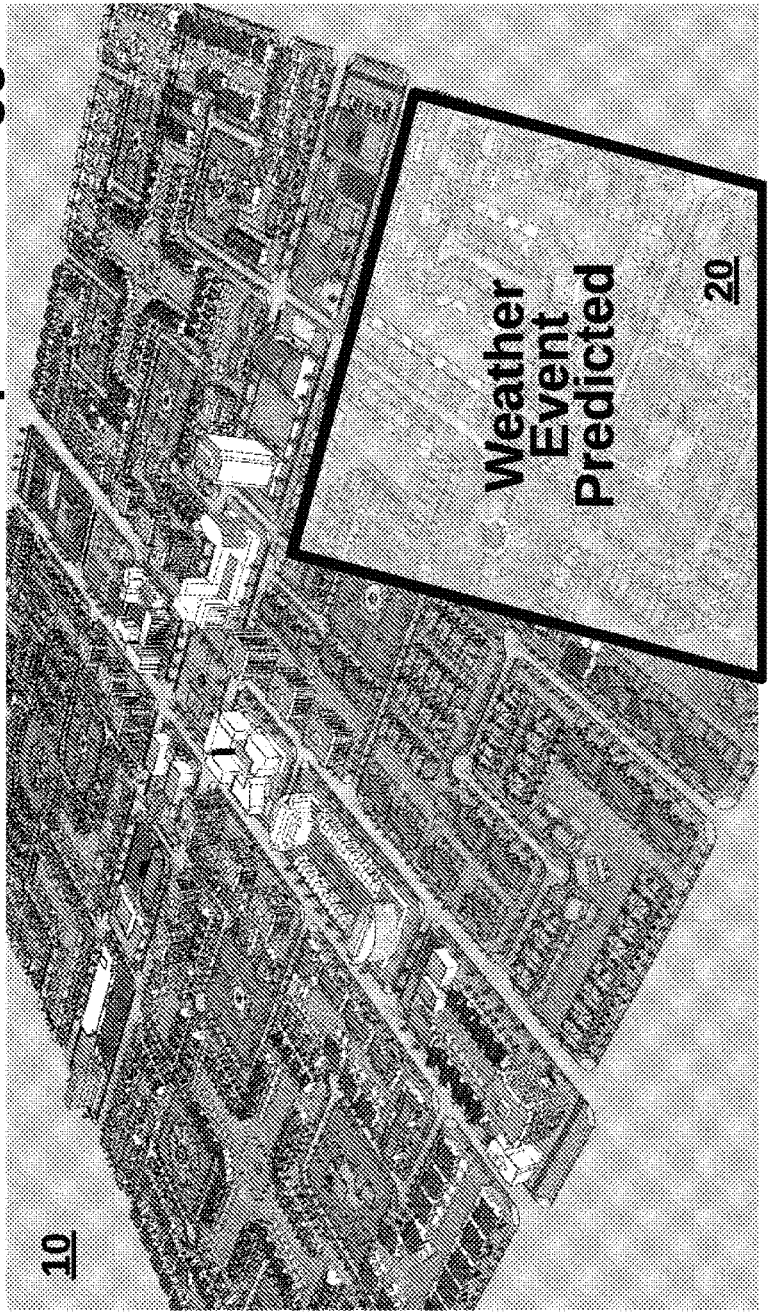
FIG. 1A illustrates an example of a cloud system generating job information in response to an upcoming or present weather event.
Figure 1A:
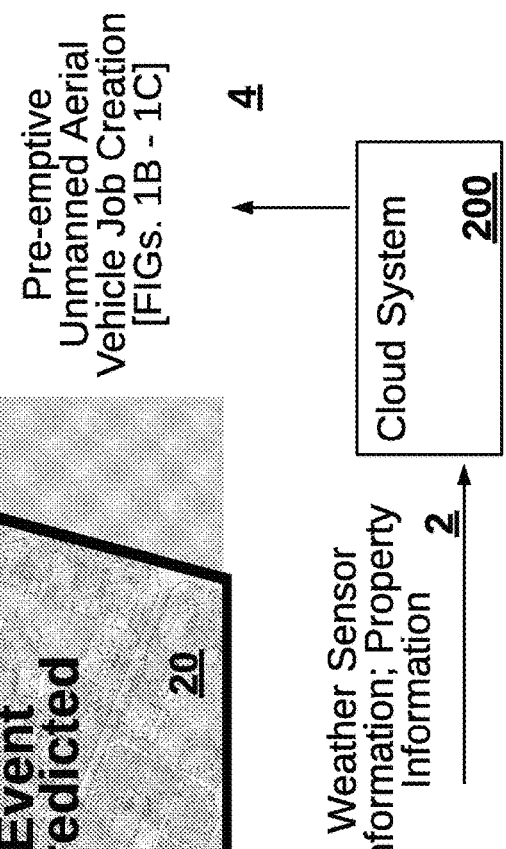

This specification describes a system (e.g., the cloud system 200 described below) that can generate jobs to be implemented (e.g., performed) by unmanned aerial vehicles (UAVs) in response to upcoming or presently occurring weather events. As will be described, the jobs can be associated with inspections of properties, such as agricultural properties; office, commercial, residential, properties; structures, such as bridges, power transmission towers, cell towers, power plants; and so on. The system can assign the jobs to operators who can travel to locations proximate to properties that are to be inspected. In combination with one or more UAVs, the operators can perform the inspections. For example, the system can determine, or receive information indicating, an upcoming hail storm, and can generate job information (e.g., one or more jobs), such that after the hail storm the jobs can be quickly implemented and affected properties inspected.

In this specification, job information includes information associated with one or more jobs, with each job specifying one or more of location information, geofence information, type of inspection, UAV information, time restrictions, flight pattern information, and so on. Location information can include global navigation satellite system GNSS coordinates (e.g., property boundary coordinates and/or a centroid of a property), address information, longitude/latitude information, and so on. Geofence information can include a geofence boundary which a UAV is to enforce. A geofence boundary can represent an area or volume in which a UAV is to remain, with the geofence boundary optionally being dependent or adjustable according to a time of day. A type of inspection can include a rooftop inspection, inspection of a structure, inspection of a power plant, and so on. UAV information can include a type of UAV (e.g., fixed-wing, multi-rotor, land-based, and so on). Time restrictions can include a window of time during which a job is to be implemented. Flight pattern information can define a particular flight pattern according to which a UAV is to navigate.

Optionally, a job can specify location information of a property, and as will be described, a user device of an operator located proximate to property can receive the job and determine a particular flight pattern for a UAV to implement. For example, the user device can define paths connected by turns, ascents, descents, and so on, which enable the UAV to perform an inspection of the property. The user device can optionally define information associated with activating sensors, such as based on the UAV being at specific waypoints, or activations according to distance or time traveled.

As will be described, the system can receive or access information associated with upcoming or presently occurring weather events, and can determine an upcoming or presently occurring weather event. For example, the system can access information specified by governmental entities (e.g., National Oceanic and Atmospheric Administration, National Weather Service, and so on), information determined from weather maps (e.g., weather surveillance radar maps), information associated with weather models, and so on. As an example, a governmental entity may specify that a hail storm is expected in particular areas (e.g., particular GNSS coordinates, longitude/latitude coordinates), at particular times, with particular sizes of the hail, and so on. The system can thus monitor information received or obtained from the governmental entity, and can identify the expected hail storm as an upcoming weather event.

Since each weather event may not warrant UAVs inspecting properties, the system can determine whether properties are to be inspected. For example, hail less than a threshold size may not be known to cause damage (e.g., damage greater than a threshold) or a rainstorm with wind less than a threshold may be routine and also not cause damage. In this example, for properties location in an area affected by the hail or rainstorm, the system can determine not to inspect the properties. As will be described, the system can determine severity information associated with a weather event (e.g., hail greater than an inch in diameter may always trigger inspections of affected properties, while wind less than 20 miles per hour may not trigger inspections), and based on the severity information can determine whether to generate jobs associated with inspecting properties. As utilized in this specification, severity information includes any information that can affect or inform a determination as to whether particular properties are to be inspected (e.g., the system can determine a likelihood that a property requires inspection based, at least in part, on the severity information). The system can monitor historical information indicating past weather events and to what extent properties were affected (e.g., damaged) subsequent to the weather events. Additionally, the system can determine whether to inspect properties based on other factors, described in more detail with respect to FIG. 4, including structural information associated with the properties (e.g., clay rooftops may crack more easily than metal rooftops), and so on.

Optionally, subsequent to the weather event, the system can generate notifications to be presented to users (e.g., property owners) associated with properties requesting whether the users think that an inspection should be performed. For example, the system can generate notifications to be presented on user devices (e.g., mobile devices) of the users, with the notifications activating one or more electronic applications (e.g., applications downloaded from an application store), and causing presentation of information received from the system to the users on the user devices. An example notification may trigger a user interface to be presented on a user device that includes textual information (e.g., "A hail storm was detected last night"), and which includes selectable options ("Does your home need to be inspected? [Select yes], [Select no], [Select maybe]"). The system can utilize the responses to inform a determination of whether to inspect properties. For example, for any affirmative selection by a user, the system can determine that an inspection is warranted. Additionally, the system can determine the overall, or measure of central tendency of, received responses. The received responses can inform whether to inspect properties of users that selected 'maybe,' 'no,' or that failed to respond. For example, if a threshold number of users selected yes in a particular area, then the system can determine to inspect other properties within a threshold distance.

As will be described, the system can identify properties in need of inspection, and can generate job information associated with (1) an initial inspection of one or more areas that include multiple identified properties, and/or (2) detailed inspections of particular identified properties. For example, the system can determine that one or more fixed-wing UAVs are to be deployed, and perform initial inspections of large areas. As an example, the system can identify that a weather event covered a geographic area encompassing a threshold number of user properties, that the geographic area was greater than a threshold area, or that the weather event was particularly severe such that properties are likely to be affected (e.g., a hail storm had hail greater than a threshold size, such as greater than an inch in diameter). The system can therefore generate job information associated with initial inspections by fixed-wing UAVs, and the fixed-wing UAVs can quickly cover large areas (e.g., the fixed-wing UAVs can navigate about an area at a threshold altitude capturing sensor information, such as images, of properties). The system can then analyze received sensor information from the initial inspections, and identify particular properties which are to receive a more detailed inspection. For example, the system can identify damage to the particular properties (e.g., based on computer vision, machine learning techniques, and so on). As will be described, detailed inspections can utilize multi-rotor UAVs which can obtain detailed sensor information of individual properties. Performing initial inspections and detailed inspections is described in more detail below, with respect to FIGS. 1A-1C.

Subsequent to generating job information, the system can assign particular jobs to operators for implementation. For example, the system can group jobs associated within a threshold distance of each other (e.g., properties located in a same area), and assign the grouped jobs to a particular operator. The system can access schedule information associated with operators, and can automatically determine assignments of jobs to operators. Additionally, the system can perform load balancing, and based on expected travel time of operators (e.g., travel between properties, for example with respect to traffic, distance traveled, and so on), the system can advantageously group jobs together such that the jobs can be completed in a timely and efficient manner.

Each operator can obtain assigned job information using a user device, also referred to as a ground control system. The operator can then travel to locations specified in the assigned job information, and perform detailed inspections of properties at the locations. The system can optionally monitor progress of the detailed inspections, and based on the detailed inspections, can determine that additional inspections are needed. For example, the system may determine that damage is affecting more properties than anticipated. In this example, the system may determine that properties along one or more directions are damaged and can extend inspections further along the directions. Similarly, the system may determine that properties included in an area expanded out from an area expected to be affected are damaged, and can extend inspections to properties in the expanded area. The system can also determine that one or more assigned inspections are not needed. For example, the system may determine that the damage is less severe than expected along one or more directions, and that assigned inspections further along the directions can be removed.

In this specification unmanned aerial vehicles include drones, un-operated aerial vehicles, remotely operated aircraft, unmanned aircraft systems, any aircraft covered under Circular 328 AN/190 classified by the International Civil Aviation Organization, and so on. In addition, certain aspects of the disclosure can be utilized with other types of unmanned vehicles (e.g., wheeled, tracked, and/or water vehicles). Sensors, which are included in the general term payload modules (e.g., any hardware, software, module, and so on, that is not critical to the flight operation of the UAV), can include any device that captures real-world information, including cameras, radiation measuring instruments, distance detectors such as Lidar, and so on.

FIG. 1A illustrates an example of a cloud system 200 generating job information 4 in response to an upcoming, present, or completed, weather event. As described above, a cloud system 200 can identify, or determine, that a weather event is predicted to affect a geographic area, such as a city, neighborhood in a city, particular zip code, and so on. The cloud system 200 can then generate job information 4 associated with inspections of properties of users. For example, a user can be associated with an insurance or inspection company.

As illustrated in FIG. 1A, an example geographic area 10 is illustrated, with the geographic area 10 including properties such as homes, apartment buildings, commercial buildings, park buildings, and so on. Based on weather sensor information 2, the cloud system 200 has determined that a particular portion 20 of the geographic area 10 is predicted to be affected by a weather event (e.g., a storm, hail, earthquake, wind, tornado, and so on). As will be described in more detail, the cloud system 200 can monitor information indicating upcoming weather events, such as information obtained from governmental entities, weather services, weather maps, and so on, and can determine that a weather event is expected to affect particular areas (e.g., area 20). As an example, the cloud system 200 can analyze weather surveillance radar maps, and optionally through use of weather models, can determine that weather events are expected to affect particular areas of a geographic area 10. For example, the cloud system 200 can determine, based on a density associated with clouds, that hail is expected to affect the portion 20. Additionally, the cloud system 200 can access information generated by governmental entities, and can determine types of weather events expected to occur, along with expected locations of the types of weather events, and information describing a severity of the weather events.

The cloud system 200 can determine whether properties of users are included in the portion 20 of the geographic area 10 predicted to be affected by the weather event. The users may be, for example, property owners which are insured through an insurance company associated with the cloud system 200. The cloud system 200 can access property boundary information associated with users located in the geographic area 10, and can determine whether the property boundary information is included in the portion 20, or is located within a threshold distance of the portion 20. As a time that the weather event is expected to arrive approaches, the portion 20 may increase in size, or may move, and the cloud system 200 can therefore anticipate this movement by being, in some implementations, over-inclusive. Additionally the cloud system 200 can provide information describing the portion 20 (e.g., boundary information, such as latitude/longitude coordinates, zip code, and so on) to an outside system and can receive indications of users, and location information of the users' properties, from the outside system. The outside system may be, for example, a server associated with an insurance company.

The cloud system 200 can optionally then generate job information 4 (e.g., prior to arrival of the predicted weather event), which as described above, can include one or more jobs associated with respective inspections of properties of users that are within, or within a threshold distance of, the affected portion 20 of the geographic area 10. That is, the cloud system 200 can generate a job associated with inspecting each property in the affected portion 20, and store information associated with the job. In this way, subsequent to the occurrence of the weather event, the job can be implemented (e.g., an unmanned aerial vehicle (UAV) can perform an inspection of an associated property). As will be described, the job information 4 can be modified over time, for example as the weather event proceeds closer to a time of arrival, and/or subsequent to the occurrence of the weather event. In this way, the cloud system 200 can reduce a number of properties that are to be inspected, or increase a number of properties, based on the movement, severity, and so on, of the weather event.

Optionally, the cloud system 200 can determine a likelihood of the weather event being associated with damage to properties, and can generate job information 4 upon the likelihood exceeding a threshold. The cloud system 200 can therefore filter weather events from triggering the generation of job information 4, thus reducing unnecessary processing time and decreasing storage space associated with maintaining job information 4. Optionally, the threshold can depend on a volatility associated with a type of the weather event, for example the cloud system 200 may store, or may have determined based on historical weather events (e.g., through use of machine learning models), that a first type of weather event (e.g., a hail storm) can be harder to predict than a second type of weather event (e.g., wind). As an example, the cloud system 200 may therefore determine to generate job information 4 based on a predicted size (e.g., diameter) of hail being relatively low, as properties may be damaged by hail occasionally being larger than the predicted low size. Additionally, the cloud system 200 may monitor and update thresholds based on empirically determined information, or may update determinations of likelihoods. For example, the cloud system 200 may determine that a particular weather event, such as wind speeds that exceed a threshold, are more likely to cause damage than initially determined (e.g., based on machine learning models, information obtained from governmental entities indicating severities of weather events, and so on), and can increase the likelihood. Additionally, the cloud system 200 can update determinations of likelihoods for specific areas, specific properties, specific materials used in properties, and so on. For example, the cloud system 200 may determine that for a particular area, a first threshold wind speed (e.g., 40 miles per hour) generally does not require inspections of properties, while for a different area the first threshold wind speed does require inspections. Similarly, if the cloud system 200 can access information (e.g., from outside systems, such as systems associated with insurance companies, real estate companies, governmental databases) indicating types of materials used in construction of properties, the cloud system 200 can determine that the first threshold wind speed is not likely to negatively affect brick properties, while it is likely to affect wooden properties. If the likelihood is less than the threshold, the cloud system 200 may instead determine not to generate job information 4. The system 200 may, for example, generate job information 4 subsequent to the weather event for any users that request an inspection be performed, or optionally the cloud system 200 can provide notifications to users requesting whether they need an inspection.

As described above, the cloud system 200 can generate job information 4 prior to the occurrence of the weather event in the portion 20 of the geographic area 10. Optionally, the cloud system 200 can instead generate job information 4 subsequent to the occurrence of the weather event. For example, the cloud system 200 can (1) determine that a weather event is predicted to affect the portion 20, (2) determine, subsequent to the weather event, properties included in the portion 20 that are to be inspected, and/or (3) generate job information 4 for the determined properties. For example, the cloud system 200 can initially store information associated with the weather event, including an indication of the portion 20, severity information associated with the weather event, and so on. Subsequent to the weather event, the cloud system 200 can determine whether specific properties of users are to be inspected, and for each specific property, can generate a job associated with the inspection.

As an example, the cloud system 200 can obtain information identifying an actual portion 20 that was affected by the weather event, and can generate jobs for properties included in the actual portion. For example, as described below with respect to FIG. 1B, an initial inspection by a fixed-wing UAV can be performed, and properties that are damaged, or that are likely to be damaged, can have jobs generated for more detailed inspections. Additionally, the cloud system can generate automatic notifications to users of properties located within a threshold distance of the portion 20, and based on the responses can generate jobs (e.g., the cloud system 200 can automatically call mobile devices of users, such as a robo-call, and request a response). As an example of automatic calls, questions indicative of likelihoods of damage can be automatically posed to users (e.g., prepared remarks, or remarks dynamically generated based on the weather event, can be provided, such as "did you experience loud wind last night," "did you experience loud hail last night," and so on). Furthermore, the automatic notifications can be provided via an electronic application executing on the user's mobile devices (e.g., an application associated with an insurance company can prompt the users to enter information).

As described above, an initial inspection of the portion 20 can optionally be performed by one or more fixed-wing UAVs subsequent to the weather event. The initial inspection can be utilized to inform specific properties in the portion 20 that are to receive a detailed inspection.

Figure 1B:
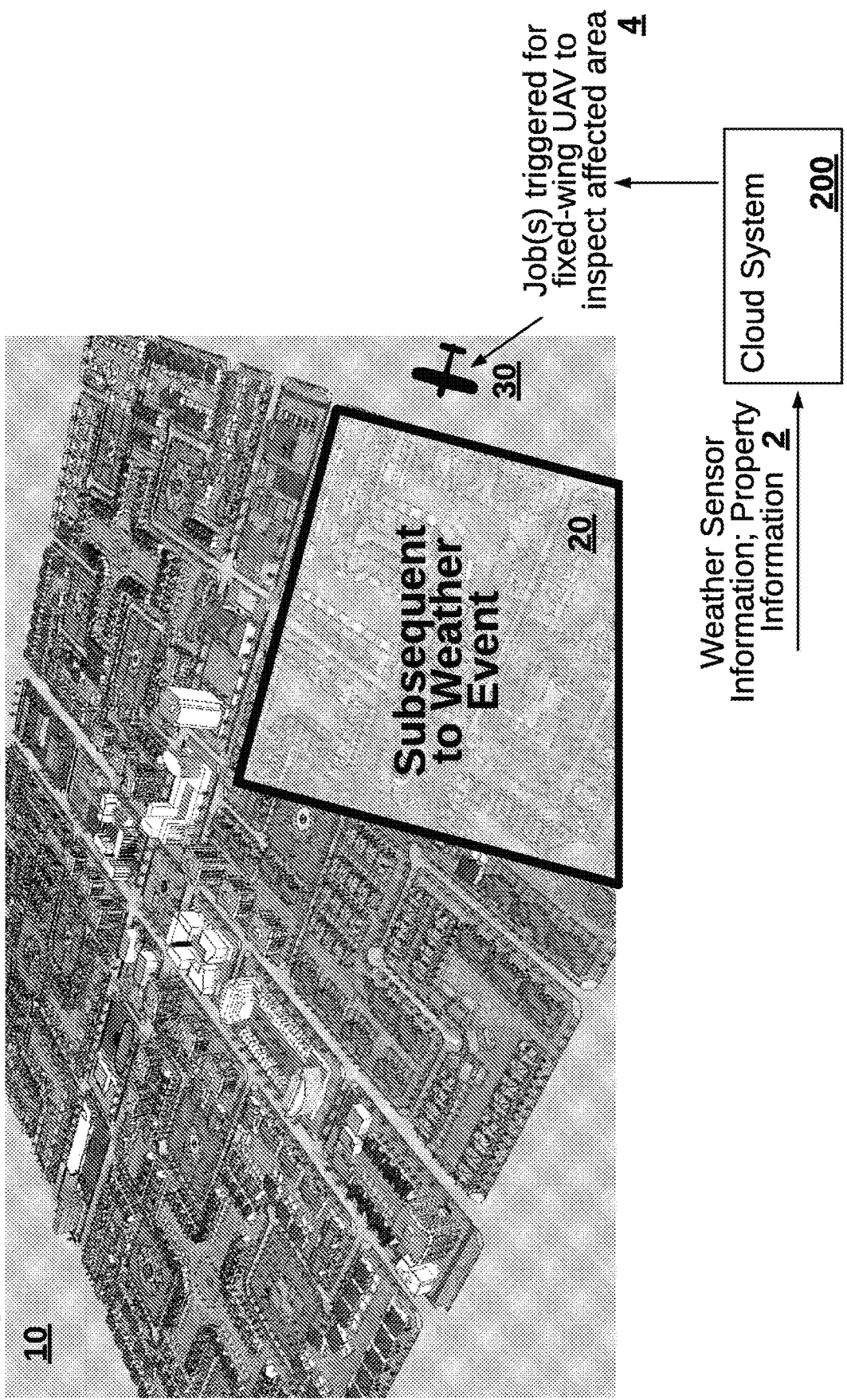
FIG. 1B illustrates an example of an unmanned aerial vehicle (UAV) performing an initial inspection of an area.

FIG. 1B illustrates an example of an unmanned aerial vehicle (UAV) 30 performing an initial inspection of an area 20 subsequent to a weather event. As described above, the cloud system 200 can generate job information 4 associated with an initial inspection of the area 20 subsequent to the weather event. In this way, the cloud system 200 can receive sensor information across the entirety of the area, and can determine (e.g., based on computer vision techniques, optionally in combination with reviewers viewing the sensor information) specific properties included in the area 20 that are to be inspected in more detail (e.g., described below, with respect to FIG. 1C).

The initial inspection can be performed such that the UAV 30 (e.g., a fixed-wing UAV, optionally multiple fixed-wing UA Vs assigned to different portions of the area 20 or multiple areas affected by weather events) can obtain sensor information sufficiently detailed to inform a determination of whether properties are to be inspected in more detail. For example, the UAV 30 can navigate at a particular altitude, and at less than a threshold speed, such that obtained sensor information (e.g., images) include at least a particular level of detail (e.g., the cloud system 200, or an operator associated with the UAV 30, can specify a minimum level of detail, such as a minimum number of pixels per distance or pixels per distance). The cloud system 200, or optionally a user device of the operator, can generate a flight pattern that causes the UAV 30 to navigate (e.g., autonomously navigate) about the area 20, and obtain sensor information describing the entirety of the area 20, or optionally describing at least all user properties included in the area 20. As will be described, for example with respect to FIG. 4, the determination of which properties are to be inspected in more detail can be based on the obtained sensor information. Optionally, the determination can be based on additional information such as weather sensors included on users' properties, and/or severity information (e.g., reports obtained from governmental entities, news reports, requests for inspections from users, and so on).

The cloud system 200 can trigger the initial inspection based on information associated with the weather event. For example, a first type of weather event (e.g., a hailstorm, or a hail storm with hail less than a threshold diameter) may not benefit from the initial inspection as the expected damage may not be clearly visible in obtained sensor information, while a second type of weather event (e.g., a tornado, wind with speeds greater than a threshold, such as 70, 80, 90, miles per hour) may benefit from the initial inspection. Additionally, the cloud system 200 can utilize expected, or determined, severities of weather events to trigger the initial inspection. For example, the cloud system 200 can trigger the initial inspection upon wind speeds being greater than a first threshold (e.g., 70, 80, miles per hour). As another example, for wind speeds less than the first threshold the cloud system 200 can request that users indicate whether their properties are to be inspected or utilize other features to determine properties (e.g., described in more detail below, with respect to FIG. 4).

Subsequent to the initial inspection, the cloud system 200 can analyze obtained sensor information (e.g., images) obtained during the initial inspection, and can identify specific user properties that have visible damage. The cloud system 200 can also identify user properties that have indications of potential damage. The cloud system 200 can also identify user properties that are unclear as to whether damage exists. The cloud system 200 can also identify user properties that have no damage. For example, the cloud system 200 can utilize computer vision techniques to compare previously taken images of properties, with images obtained during the initial inspection, and can determine based on comparisons whether damage is evident in the images. Additionally, the cloud system 200 can utilize scale invariant feature transform techniques, eigenspace techniques, techniques to determine outlines included in images, and match outlines to shapes of damage or features associated with damage, and so on.

Optionally, the cloud system 200 can present the obtained sensor information to one or more reviewing users, and the reviewing users can specify properties that are to be inspected in more detail. For example, the cloud system 200 can generate user interface to be presented via one or more displays (e.g., displays of user devices in communication with the system 200), and can include the sensor information for review. The reviewing users can then interact with the user interface to zoom in, zoom out, pan, notate portions, cause highlighting of properties associated with users, request any prior historical images of properties (e.g., obtained during prior initial inspections or detailed inspections), and so on. The reviewing users can then assign whether individual properties are to be inspected. For example, the reviewing users can assign that a particular property (1) has evident damage, (2) has indications of damage, or (3) has no damage. Upon an assignment, the user interface can optionally shade the property according to the assignment (e.g., adjust a color of the property as illustrated). For example, an assignment of damage can cause a property to be shaded a first color (e.g., green, yellow, red). As another example, an assignment of indications of damage can cause the property to be shaded a second color (e.g., green, yellow, red). As another example, an assignment of no damage can cause the property to be shaded a third color (e.g., green, yellow, red). In this way, subsequent reviewing users can quickly view the user interface and determine which properties are in need of inspection, and can analyze outliers closely (e.g., a red property surrounded by green properties), and so on. Additionally, the cloud system 200 can perform particular types of computer vision processing techniques to aid the reviewing users. For example, the cloud system 200 can adjust a contrast of the images to highlight features, perform boundary detection, and so on.

The cloud system 200 can further generate rectified images which can be presented to the reviewing user. A rectified image can be, for example a geo-rectified images, such as an ortho-mosaic of geo-rectified images stitched together from the obtained sensor information (e.g., images, or other sensor information). The rectified image can be generated based on a GNSS receiver included in the UAV 30, optionally in combination with pose information associated with the sensor information (e.g., camera pose). In this way, when reviewing users select a particular property (e.g., select a portion of a rectified image), and assign the particular property to be inspected, the cloud system 200 can store location information associated with the particular property. As will be described below, each of the properties to be inspected can be associated with a waypoint, indicating that a more detailed inspection is to take place (e.g., using a multi-rotor UAV).

Figure 1C:
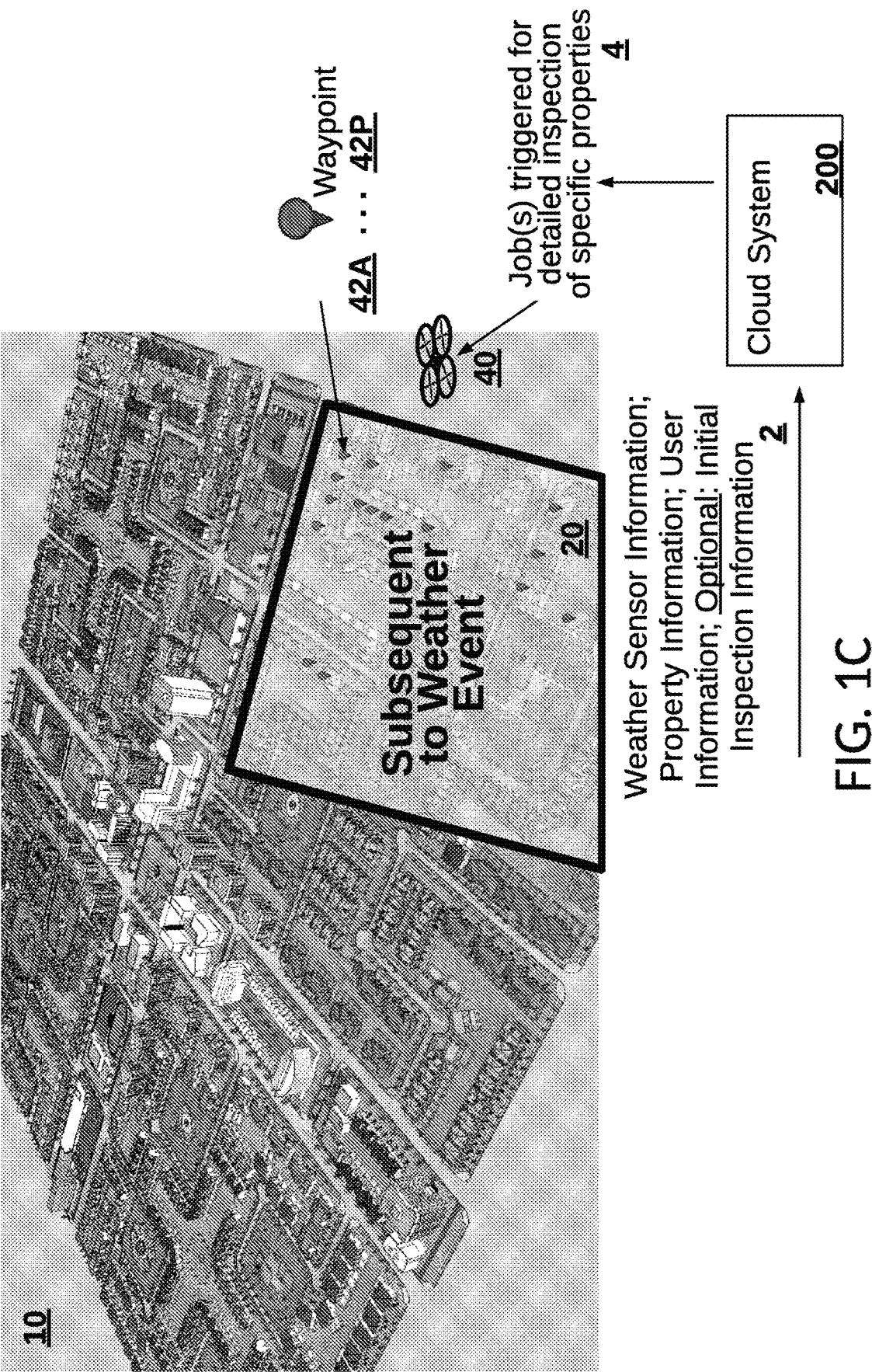
FIG. 1C illustrates an example of a UAV performing a detailed inspection of particular properties.

FIG. 1C illustrates an example of an unmanned aerial vehicle (UAV) 40 performing a detailed inspection of particular properties. The cloud system 200 can determine particular properties that are to receive detailed inspections, and can generate jobs associated with the inspections. As will be described, one or more operators can be assigned a portion, or all, of the jobs, and can travel to the particular properties with the UAV 40 (e.g., a multi-rotor UAV). The UAV 40 can then navigate according to a flight plan (e.g., generated by the cloud system, or optionally generated by a user device of the operator), which can depend on a type of the property or type of damage expected. For example, inspecting a cell-phone tower may be associated with a particular flight pattern in which the UAV 40 navigates at a particular altitude to waypoints surrounding the tower. In this example, at each waypoint the UAV 40 can descend to within a threshold distance of the ground obtaining sensor information, and after ascending back to the waypoint can navigate to a subsequent waypoint. As another example, inspecting a rooftop of a residential home can be associated with a different flight pattern. In this example, the UAV 40 can navigate at a same distance from the rooftop obtaining sensor information.

As illustrated in FIG. 1C, each of the particular properties is associated with a waypoint (e.g., waypoints 42A-42P), and each job can indicate one or more of the waypoints. For example, each waypoint can specify a centroid of the property, and a particular flight pattern to inspect the property can be determined based on the waypoint. As an example, the cloud system 200, or optionally the user device of the operator, can access property boundary information associated with the property, and can generate the flight pattern to cause the UAV 40 to obtain sensor information describing the property. Additionally, the cloud system 200, or user device, can determine a portion of the property that is to be inspected (e.g., a rooftop). For example, the determination can be based on images obtained during the initial inspection (e.g., the cloud system 200 or user device can identify boundary information of a rooftop). Determining a flight pattern is described in more detail below.

Furthermore, the UAV 40 can utilize disparate sensors to sufficiently obtain a detailed inspection. The UAV 40 can be required to obtain images with at least a threshold level of detail (e.g., as described above, a minimum number of pixels per distance), and based on the weather event, can utilize sensors that are useful in indicating damage. For example, subsequent to a hail storm the UAV 40 can utilize heat sensors to determine portions of a rooftop that are leaking heat, which as an example may indicate damage.

In addition to generating job information 4, the cloud system 200 can assign included jobs to particular operators. For example, the cloud system may assign jobs associated with waypoints 42A-42F to a first operator, while a second operator may be assigned the remaining waypoints. To determine which jobs are assigned to which operators, the cloud system 200 can access schedule information indicating available operators, and can group jobs together according to geographic area, optionally in combination with expected times to navigate to each waypoint included in a group. For example, jobs proximate to each other, but included in a dense city with high traffic and/or one-way streets, may be separated into distinct groups.

Figure 2:
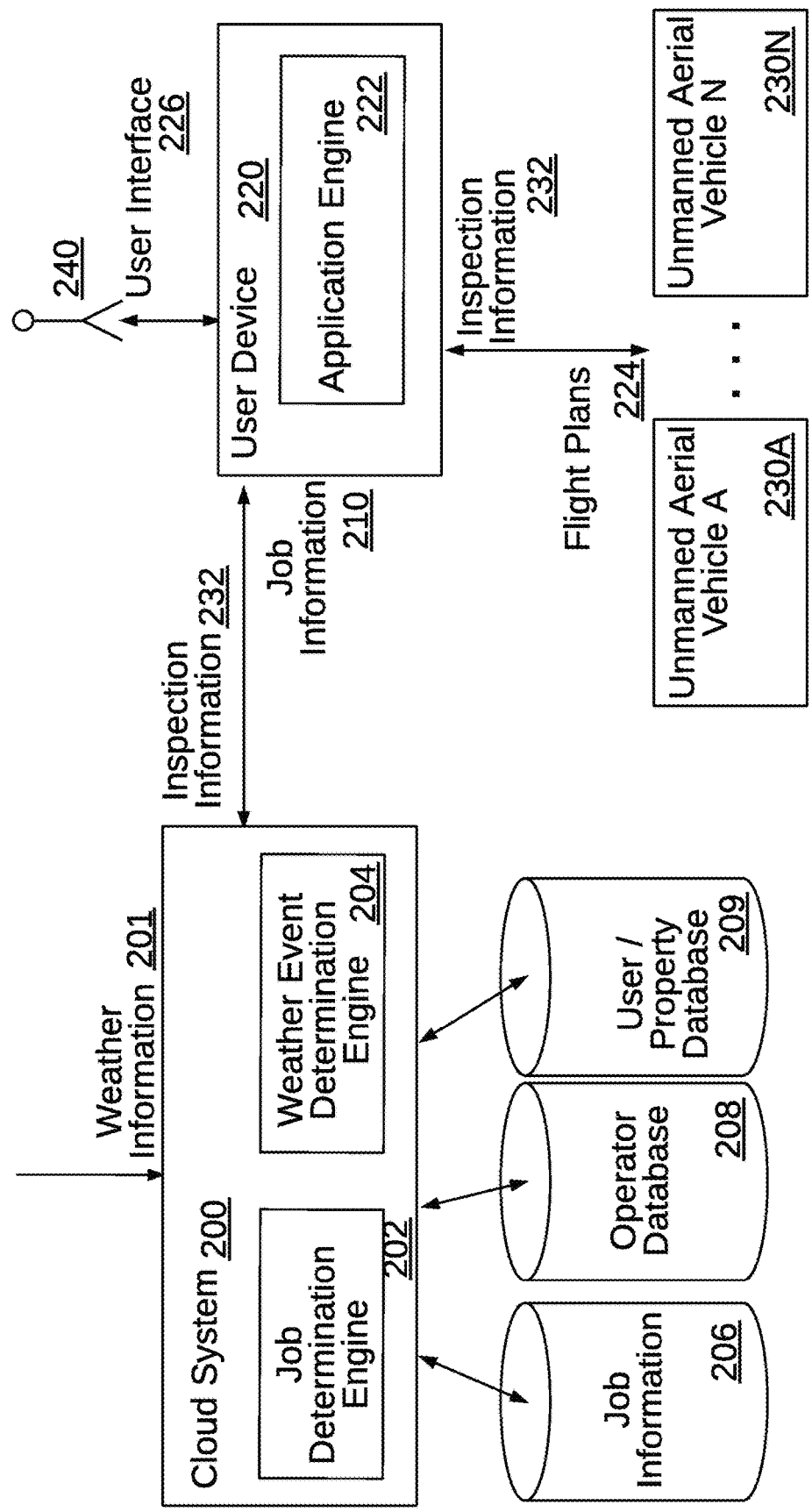
FIG. 2 illustrates a block diagram of a cloud system in communication with a user device of an operator.

FIG. 2 illustrates a block diagram of a cloud system 200 in communication with a user device 220 of an operator 240. The cloud system 200 can be a system of one or more computers, or one or more virtual machines executing on a system of one or more computers, and can maintain, or be in communication with, one or more databases or storage subsystems (e.g., databases 206, 208, 209). The user device 220 can be a laptop, tablet, mobile device, wearable device, and so on, that is associated with an operator 240 implementing inspections in combination with one or more unmanned aerial vehicles (UAVs 230A-230N). The user device 220 can be in communication (e.g., wired or wireless communication) with the cloud system 200, for example over a cellular connection (e.g., 3G, 4G, LTE, 5G), or via a mobile device of an operator. As an example, the mobile device can be in communication with the cloud system 200 over a cellular connection, and the mobile device can relay information over a Bluetooth or Wi-Fi connection between the user device 220 and cloud system 200. Similarly, the UAVs (e.g., UAV 240A) can receive information from, and provide information to, the user device 220, for example over a wired or wireless communication.

As described above, the cloud system 220 can monitor information associated with upcoming or presently occurring weather events (e.g., weather information 201), and can generate job information 210 associated with inspections of particular properties. The cloud system 220 includes a weather event determination engine 204 that can access weather information 201 obtained from governmental entities. For example, the engine 204 can monitor web pages, XML data, and so on, associated with governmental entities that specify weather events. The weather event determination 204 can access information associated with weather models, sensor information from specialized sensors installed on properties, and so on, and can determine, or detect (e.g., via weather sensors), upcoming or presently occurring weather events. As described above, the weather events can be analyzed, such that weather events which are unlikely to cause damage may be filtered, while weather events with a likelihood of damage being greater than a threshold, may trigger generation of job information 210. Determining likelihoods of weather events being associated with damage is described in more detail below, with respect to FIG. 3.

Based on determining that a likelihood of damage being caused by a weather event exceeds a threshold, the weather event determination engine 204 can determine properties associated with users that are included in an area expected to be affected by the weather event. As described above, a user of a property can indicate a property insured by an insurance company associated with the cloud system 200. The weather event determination engine 204 can access one or more databases (e.g., the user/property database 209) and can identify properties included, or within a threshold distance of, the area expected to be affected. The engine 204 can store the identifications (e.g., in the job information database 206), and can optionally update the identifications to remove, or add additional, properties as the weather event progresses or finishes.

The cloud system 200 further includes a job determination engine 202 that can generate job information 210, and assign the job information 210 to particular operators (e.g., operator 240) for implementation. For example, and as described above, the cloud system 200 can obtain operator information, such as schedule information in an operator database 208, and can assign particular jobs to operators. As described above, the cloud system 200 can determine that an initial inspection is to be performed (e.g., via a fixed-wing unmanned aerial vehicle, for example based on a type of weather event, severity of the weather event, and so on), and/or that detailed inspections of particular properties are to be performed. The job determination engine 202 can generate the job information, which can include jobs associated with respective properties and can indicate one or more of location information associated with a property, geofence boundary information, times during which the job can be implemented, and so on.

The user device 220 of the operator 240 can execute an application (e.g., an application obtained from an electronic application store, a software application installed on the user device 220), and the application can generate user interface 226 data for presentation to the operator 240. As will be described below, and illustrated in FIG. 9, the user device 220 can present user interfaces associated with each job received by the user device (e.g., assigned to the operator 240 by the cloud system 200), for example representations of a flight pattern associated with inspecting a property, geofence boundary information, and so on. Optionally the operator 240 can modify aspects of the flight pattern, such as a launch/landing location, particular waypoints to be traveled to by a UAV, actions to take at each waypoint or between waypoints (e.g., activating particular sensors), and so on. Optionally the operator 240 may modify particular aspects of a flight pattern, but be restricted with respect to other aspects (e.g., the operator 240 can modify a flight pattern, but be constrained by a geofence boundary associated with a property boundary of a property being inspected).

The user device 220 can provide flight plans 230A (e.g., information sufficient to enable a UAV to navigate, for example autonomously navigate, and implement an inspection of one or more properties) to one or more UAVs 230A-230N that are to implement the flight plans 230A. Subsequent to, and/or during, implementation of a flight plan, the user device 220 can receive inspection information 232 from a UAV, such as sensor information (e.g., camera images, heat information, radiation information, pressure information, distance readings, and so on). This inspection information 232 can be provided to the cloud system 200 for storage, and further processing (e.g., damage can be identified using computer vision techniques, optionally in concert with reviewing users).

Figure 3:
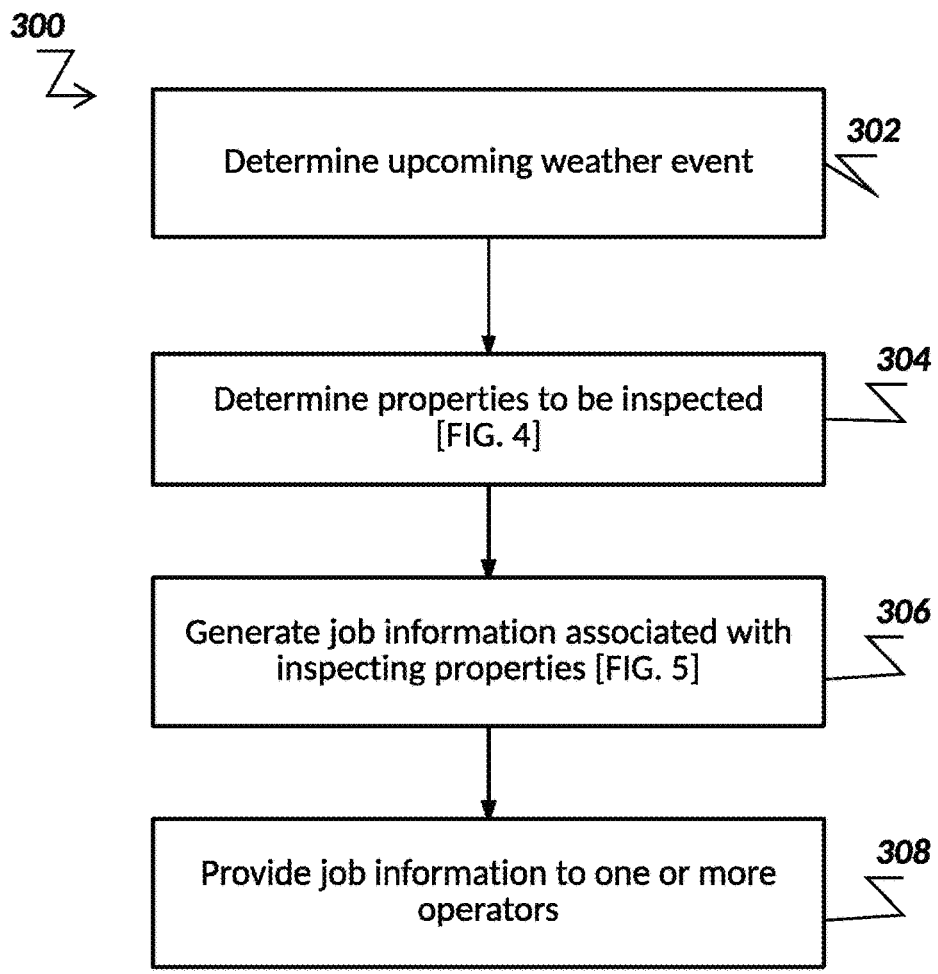
FIG. 3 illustrates a flowchart of an example process for performing inspections of properties using unmanned aerial vehicles (UAVs).

FIG. 3 illustrates a flowchart of an example process 300 for performing inspections of properties using unmanned aerial vehicles (UAVs). For convenience, the process 300 will be described as being performed by a system of one or more computers (e.g., the cloud system 200).

One or more features described in process 300 can be triggered to be performed (e.g., by the system) automatically (e.g., without user input), while one or more other features can be performed in response to user input. A user of the system (e.g., an administrator) can specify actions and features that are to be performed automatically, for example in response to determined weather events, and other actions and features that are to be performed in response to user input.

As an example, the system can determine upcoming, or presently occurring, weather events through routine (e.g., periodic) monitoring of weather information, or the system can subscribe to updates regarding weather events (e.g., subscribe to updates received from governmental entities), and so on. In response to determining upcoming or presently occurring weather events, the system may automatically determine user properties in one or more areas that may be affected by the weather event, along with information indicating likelihoods of damage to the user properties. A user of the system may then review the determined user property information, and provide user input to the system indicating that the system is to generate job information. The job information can include one or more jobs associated with fixed-wing UAV inspections of the one or more areas. The job information can also include jobs associated with detailed inspections of the determined user properties. That is, the user may view a user interface (e.g., generated by the system, or that can provide information to, and receive information from, the system), or set rules for the system to follow (e.g., rules can specify conditions for which user input is required, such as specific types of weather events may require user input), and the user can rapidly indicate whether to proceed with generating job information, assigning the job information to operators for implementation, and so on. Alternatively, the system may automatically generate job information. For example, if a likelihood of damage of a determined weather event exceeds a threshold (e.g., a hail storm with greater than a threshold size hail, a storm with greater than a threshold wind speed), the system may automatically generate job information associated with a fixed-wing UAV inspection, detailed inspections of properties, and so on. In this way, the system may reduce complexities associated with monitoring weather events, determining properties likely to be affected by the monitored weather events, preparing flight plans for individual inspections of properties, and so on. Causing inspections of properties, including initial high-level fixed-wing UAV inspections, can advantageously be reduced in complexity to a 'one-click.' That is a user of the system may simply select, on a user interface, that after a weather event, the system proceed with generating a job associated with an initial inspection. For example, the system can prepare a flight plan for a fixed-wing UAV to autonomously follow, designate geofence boundaries associated with an area of inspection, and assign the job to an operator.

The system determines an upcoming weather event (block 302). As described above, the system can monitor information obtained from, and generated by, governmental entities, weather entities (e.g., weather prediction companies, agencies), weather sensors, and so on, and can determine the existence of the upcoming weather event. For example, a governmental entity can publish upcoming weather events such as hail storms, and the published information can indicate a location (e.g., a geographic area, a zip code, a city name, a neighborhood name, boundary information) that the weather event is expected to affect. The published information can further indicate a type of the weather event (e.g., hail storm). The published information can further indicate an expected severity of the weather event (e.g., an expected size of hail, or for a storm, expected rainfall, wind speed, tornado information and ratings, and so on).

The system can filter weather events based on a likelihood of the weather event causing damage being below a threshold. To determine the likelihood, the system can utilize machine learning models trained on historical information associated with weather events and damage experienced from the weather events. As an example, a governmental entity may publish prior weather events describing an expected damage of the weather event, along with information describing actual damage. The information escribing actual damage may textually describe damage experienced (e.g., '5 homes were damaged,' 'damage reported in office building,' 'windows broken,' 'hail greater than 1 inch in diameter reported,' and so on), and the system may parse the textual data to determine information indicating an extent of the damage. Additionally, the machine learning models can store general rules associated with weather events and likelihoods of damage. For example, the system can determine, or store information identifying, that tornados with particular ratings (e.g., Fujita scale ratings) are associated with particular likelihoods of damage, or hail of differing sizes are each associated with differing likelihoods of damage, and so on. Additionally, the system can learn likelihoods of damage over time, for example after weather events the system can determine a number of claims actually filed for damage of properties, and the extent of the damage identified, and can update the likelihoods.

The system determines properties to be inspected (block 304). Subsequent to determining a weather event (e.g., an upcoming or presently occurring weather event), the system determines particular properties of users that may be affected by the weather event (e.g., negatively affected, such as that a likelihood of the property being damaged exceeds a threshold). The system can update the determination as the weather event progresses, or completes, as will be described below with respect to FIG. 4, and can obtain properties that are to be inspected. Since there may be multitudes of properties in areas expected to be affected by the weather event, but only particular properties associated with users (e.g., users whose properties are insured by a company associated with the system), the system can either (1) obtain information identifying user properties and filter the user properties to properties located in areas expected to be affected, or (2) provide information describing the areas expected to be affected to an outside system. The outside may be a system associated with an insurance company, inspection company, and so on. The system can then receive information indicating locations of user properties within the affected areas.

The system generates job information associated with inspecting properties (block 306). As described above, the system can generate jobs associated with inspecting the properties determined in block 304. For example, the system may rapidly deploy one or more fixed-wing UAVs to perform an initial inspection, and the system, optionally in combination with a reviewing user as described above, may determine properties that are to be inspected in more detail. Through generating jobs, and as will be described assigning the jobs to operators, all of the determined properties may be quickly designated as needing inspections.

The system provides job information to operators for implementation (block 308). As described above, and as will be described in more detail below with respect to FIG. 7, the system assigns jobs to operators. The system can access schedule information associated with operators, along with availability of UAVs, or UAVs that include particular sensors (e.g., after a hailstorm, the system may reserve UAVs that include or can access heat sensors), and can determine a number of available operators and/or UAVs that can implement the jobs. The system can then assign jobs to operators, which can optionally be grouped according to geographic locations of the jobs (e.g., the system can cluster properties that need to be inspected into jobs assigned to a same operator).

Figure 9:
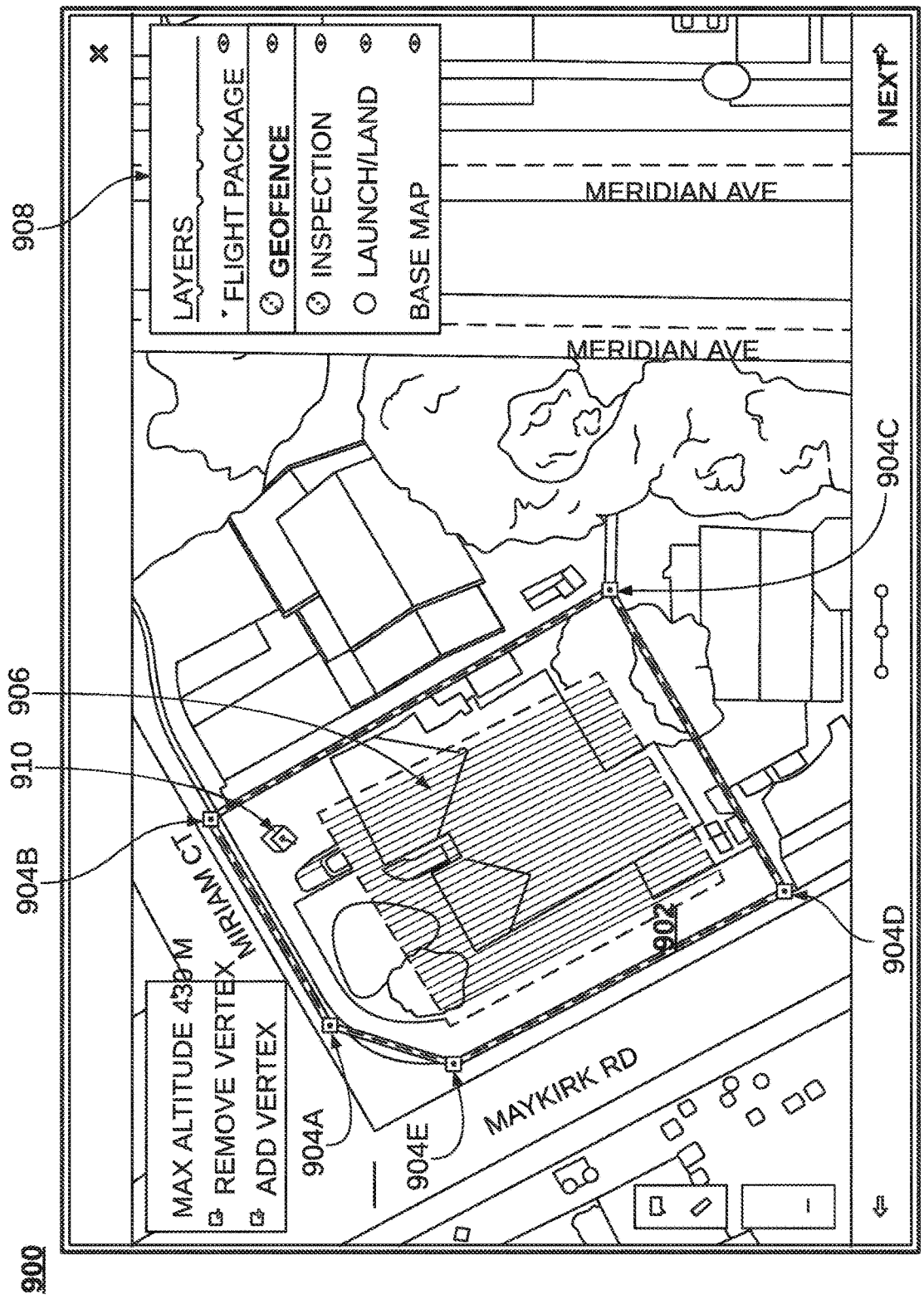
FIG. 9 illustrates an example user interface describing a job to inspect a particular property.

An assignment of one or more jobs to an operator can include the system providing (e.g., pushing) information to a user device of an operator (e.g., a user device from which the operator logs into the system, or accesses the system) describing the jobs. Additionally, the assignment can specify times during which the operator is to complete the jobs, along with location information associated with each job. Optionally a type of inspection to be performed can be presented. As an example with respect to a rooftop damage inspection, the user device can present information indicating that "damage was identified on the rooftop of this property." As illustrated in FIG. 9, the user device can present user interfaces describing each job, for example one or more images of a property associated with the job, along with a flight pattern associated with inspecting the property (e.g., determined by the user device based on the location information, type of inspection, and so on, or determined by the system and provided to the user device). The user device can also provide a flight plan to a UAV while located proximate to the property with the flight plan, thus enabling the UAV to perform the inspection (e.g., autonomously perform the inspection).

Figure 4:
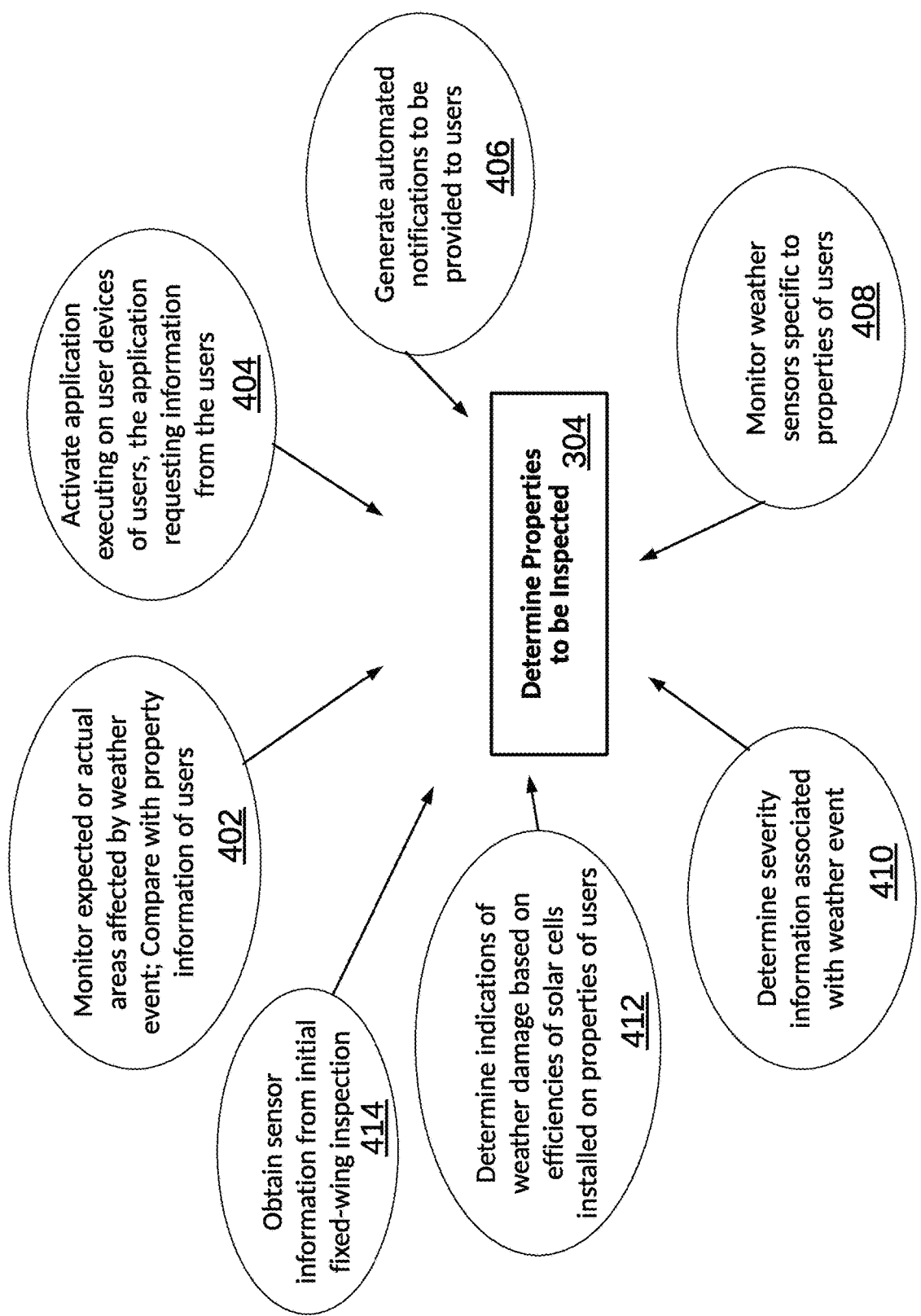
FIG. 4 illustrates determining properties to be inspected based on features.

FIG. 4 illustrates determining properties to be inspected based on features (e.g., features 402-412). For convenience, determining properties will be described as being performed by a system of one or more computers (e.g., the cloud system 200). As described above with respect to FIG. 3, the system determines properties to be inspected subsequent to determining that a weather event is to affect one or more areas. The features 402-412 illustrated in FIG. 4 can be utilized to inform the determination of properties, and can be combined, weighted, and so on, to determine actual properties to be specified in jobs assigned to operators.

To determine particular properties for inspection, the system can monitor a progress of the weather event 402, for example monitor areas expected to be affected by the weather event, and identify user properties located in the monitored areas. That is, a weather event may initially be designated (e.g., by a governmental entity) as affecting a large area, however as the weather event progresses the designation can be updated to reduce the area, and as the weather event occurs the area can be reduced or eliminated. The system can therefore monitor an area that is actively expanding or reducing in size, until subsequent to the weather event.

Additionally, the system can generate notifications 404 to be provided to users located in areas expected to be affected, for example as determined in 402, and the notifications can be presented on user devices of users as described above. That is, subsequent to the weather event, the system can request that users located within, or proximate to, the determined areas indicate whether their property is in need of inspection (e.g., the user device can request whether hail was heard, loudness of wind, whether damage is evident, and so on. Additionally, and as described above, the system can automatically call users 406, or provide SMS, MMS, texts or notifications to users, requesting information.

The system can access specialized hardware 408 included on one more properties, which can measure weather information via one or more sensors, and can utilize the information to inform a more detailed picture of the weather event. For example, an insurance company may require that users include specialized hardware on their rooftops, or that a threshold number of users include the hardware within a particular area, and the specialized hardware can communicate with the system, or with an outside system that provides information to the system. As an example, the hardware may connect via the Internet, or through mobile connections, to the system, or outside system, and can provide sensor information measured during the weather event. The sensor information can include temperature, pressure, images, and so on, and the system can determine properties to be inspected based on the specialized hardware.

The system can determine severity information associated with the weather event 410. As described above, the system can determine a likelihood of damage, along with an area in which the likelihood is greater than a threshold. For example, the system can monitor the area expected to be affected by the weather event, and based on information received from governmental entities, or via analyzing weather radar images and feeds, the system can determine likelihoods of damage.

Subsequent to the weather event, the system can access information indicative of damage to properties, for example reductions in efficiencies of solar cells 412 installed on the properties. Since a reduction in efficiency can indicate damage to the solar cells, the system can utilize the information to inform whether the property may be damaged. For particular types of weather events, such as hail, tornados, earthquakes, and so on, reductions in efficiencies can be more strongly correlated to actual damage, while other types of weather events, such as blizzards, may indicate that the solar cells are being blocked (e.g., snow has collected on them). The system can determine an expected efficiency given sunlight conditions, average or actual placement of the solar cells on properties, and so on, to determine whether reductions are being experienced.

As described above, an initial fixed-wing UAV inspection 414 can be performed, and the system can determine an extent of damage to properties based on obtained sensor information. A reviewing user can designate properties that are to be inspected, or properties that may need to be inspected, and the system can incorporate the information into the above factors to generate a more complete picture of properties negatively affected.

Based on the factors 402-414, the system can accurately determine properties that are to be inspected. For example, the system can weight (e.g., the system can store information indicating weights) each of the factors, and determine properties that satisfy a threshold (e.g., the system can determine a value for each factor, for each property, and after weighting can determine an overall score associated with the factors). Optionally, if the system determines that particular properties are to be inspected, but one or more other properties within a threshold distance are not to be inspected, the system can assign jobs for the other properties, or optionally indicate that a UAV inspecting a proximate property is to point its sensors (e.g., cameras) towards the other properties, and actively determine whether the other properties are to be inspected. In this way, if the system isn't sure (e.g., greater than a threshold) that the other properties need inspection, the system can obtain sensor information (e.g., images) of the properties while a UAV is inspecting a proximate property. Furthermore, if the damage to the proximate properties is greater than a threshold (e.g., greater than expected), the system can determine that the other properties are likely to also be damaged.

Figure 5:
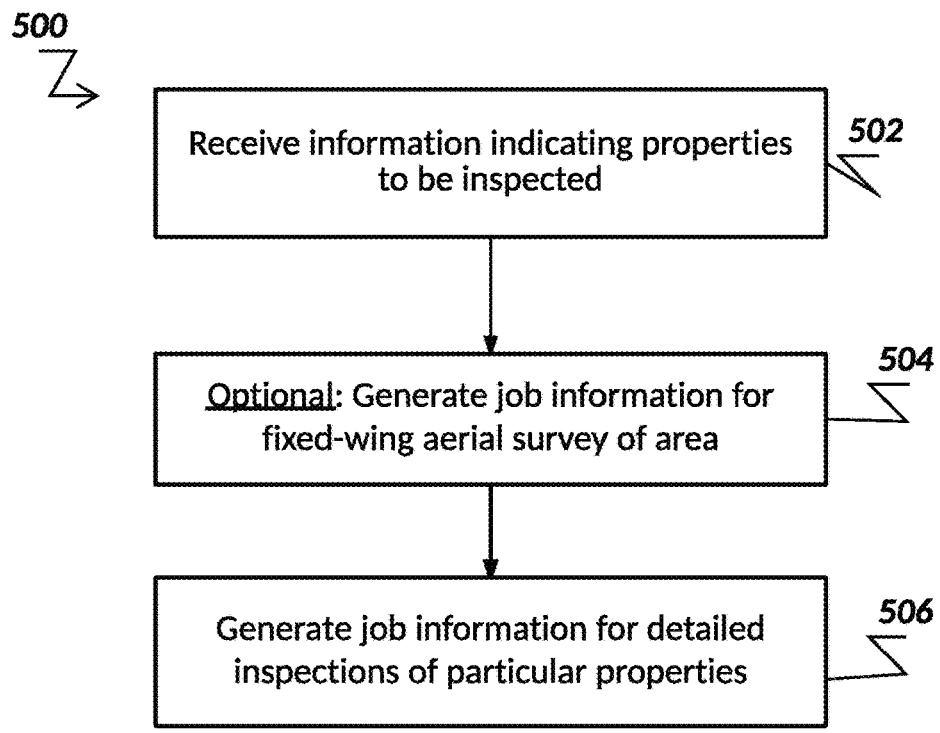
FIG. 5 is a flowchart of an example process for generating job information.

FIG. 5 is a flowchart of an example process 500 for generating job information. For convenience, the process 500 will be described as being performed by a system of one or more computers (e.g., the cloud system 200).

The system receives information indicating properties to be inspected (block 502). As described above, with respect to FIGS. 3-4, the system can determine properties that are to be inspected.

The system optionally generates job information for a fixed-wing inspection of one or more areas that include the indicated properties (block 504). As described above, the system can determine properties that are to be inspected, and the system can perform an initial inspection to update the determination. In this way, the system can remove initially determined properties if they are not in need of an inspection, can expand to additional properties, and so on.

The system generates job information for detailed inspections of particular properties (block 506). As described above, the system can generate a job for each property that is to be inspected, or can optionally combine adjacent properties into a same job (e.g., a geofence boundary can include both properties, and a UAV can inspect a first property, then navigate immediately to the second property).

Figure 6:
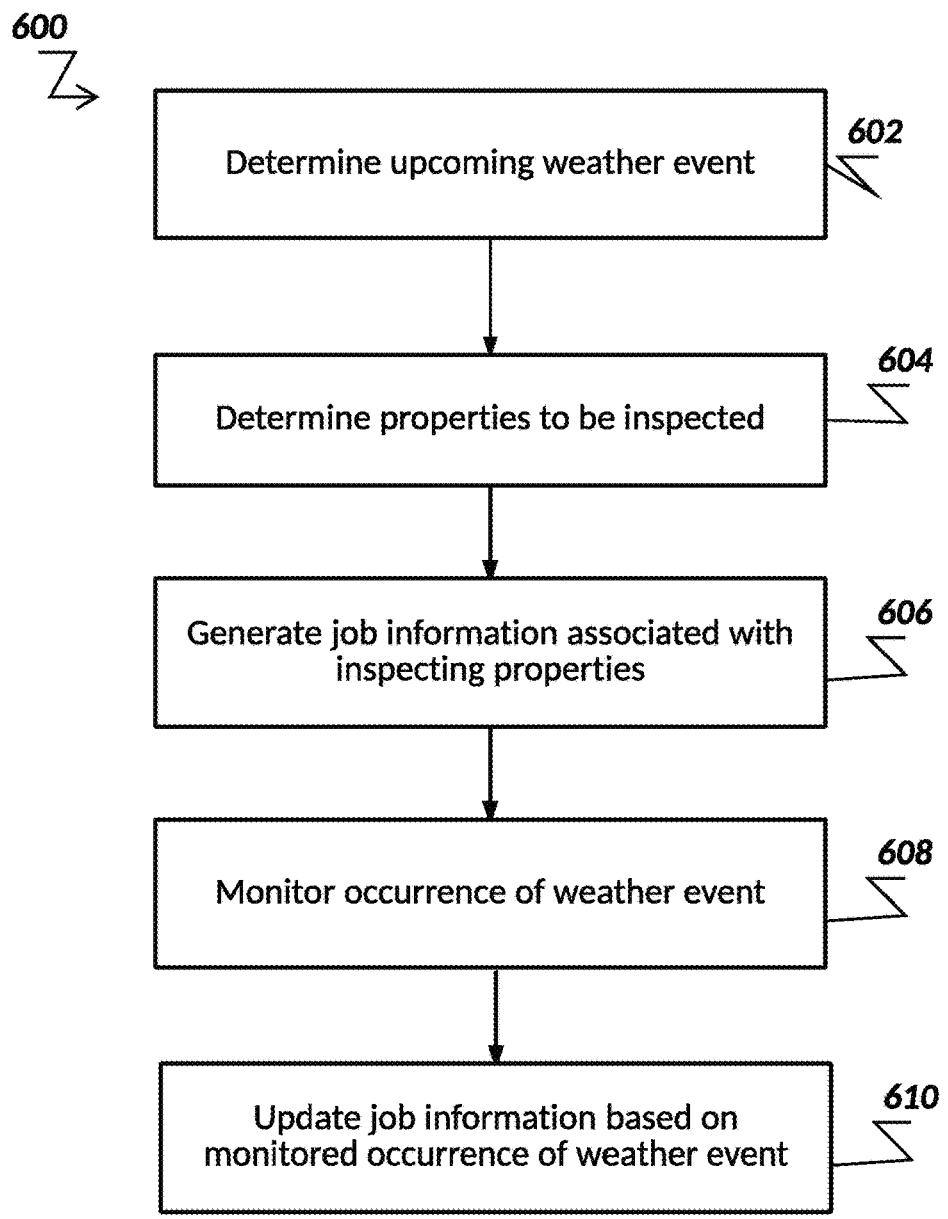
FIG. 6 is a flowchart of an example process for updating job information based on monitoring a weather event.

FIG. 6 is a flowchart of an example process 600 for updating job information based on monitoring a weather event. For convenience, the process 600 will be described as being performed by a system of one or more computers (e.g., the cloud system 200).

As described above, with respect to FIG. 3, the system determines an upcoming weather event (block 602), and determines properties to be inspected (block 604). Optionally, the system can pre-emptively generate job information (block 606) associated with the determined properties. As the weather event progresses, the system can update its determination of properties to be inspected through monitoring the weather event (block 608), and can generate updated job information (block 610) based on the occurrence of the weather event. As described above, through pre-emptively generating job information, the system can immediately ready to perform inspections. Alternatively, the system can generate job information subsequent to the weather event associated with particular properties, for example as determined in FIG. 4.

Figure 7:
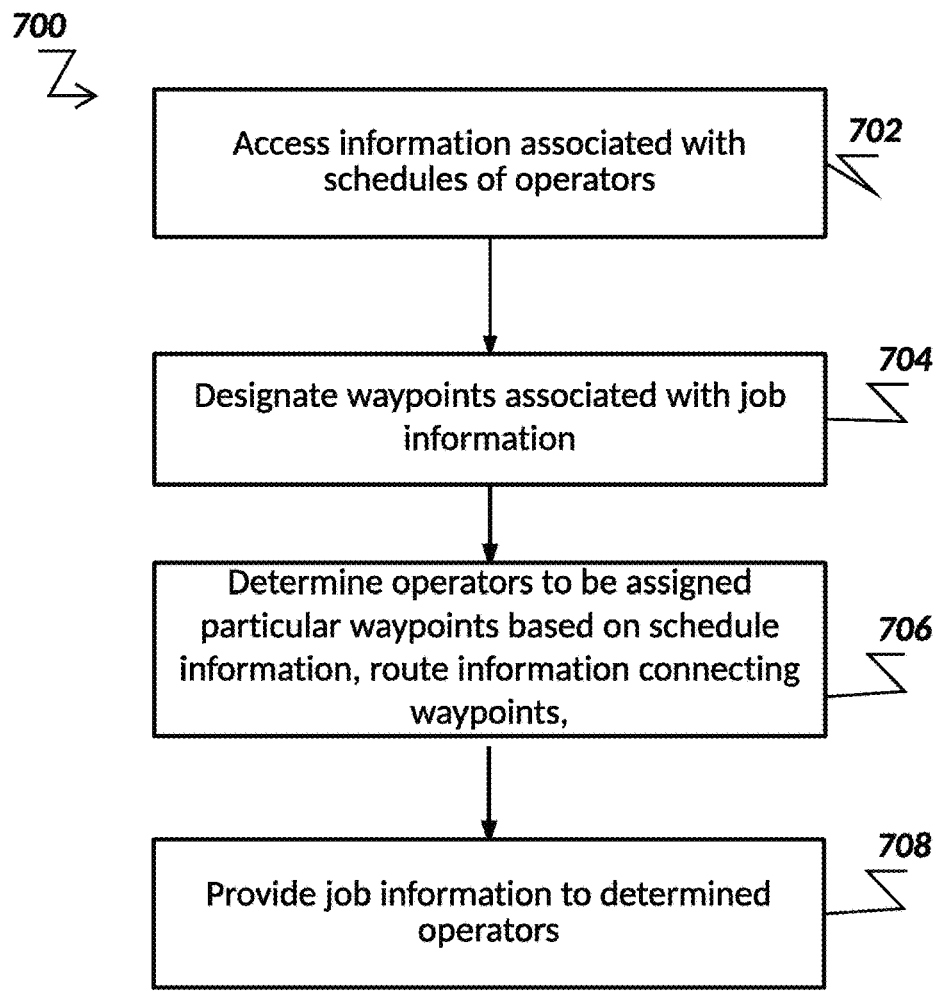
FIG. 7 is a flowchart of an example process for providing job information to operators for implementation.

FIG. 7 is a flowchart 700 of an example process for providing job information to operators for implementation. For convenience, the process 700 will be described as being performed by a system of one or more computers (e.g., the cloud system).

The system access schedule information of operators (block 702). As described above the system can store, or maintain, schedule information associated with operators, and identify operators that are available to perform inspection of properties.

The system designates waypoints associated with job information (block 704). As illustrated in FIG. 1C, the system designates waypoints (e.g., a centroid of a property) for each job, and can therefore determine routes connecting the waypoints. The system determines operators to be assigned to particular jobs based on the waypoint information, and routes connecting the waypoints (block 706). The system can cluster jobs such that a route connecting waypoints associated with the cluster jobs are within a threshold distance, or along a same direction, that loop from a starting position back to within a threshold distance of the starting position, and so on. The system can access traffic information, such as expected traffic information, and can utilize load balancing techniques to determine a total number of operators. The system can determine an assignment of the operators to particular jobs. The system can determine an assignment of UAVs to operators. For example, the system may have a threshold number of UAVs that can be used to inspect the properties (e.g., the inspection may require a heat sensor), and the system can assign time slots for use of the UAVs to operators, and assign routes such that a maximum number of properties can be inspected in a day.

The system provides job information to operators (block 708). As described above, the system assigns jobs to operators, and user devices of the operators can receive, or obtain, job information associated with the inspections. Optionally, the system can provide any updates to job information to user devices, for example via a mobile network (e.g., 4G, 3G, LTE). As an example, the system can determine that inspections of properties are no longer needed, for example based on receiving information from inspections indicating that damage is not as extensive as expected. The system can then automatically remove jobs, notify operators regarding the removal, and so on.

Figure 8:
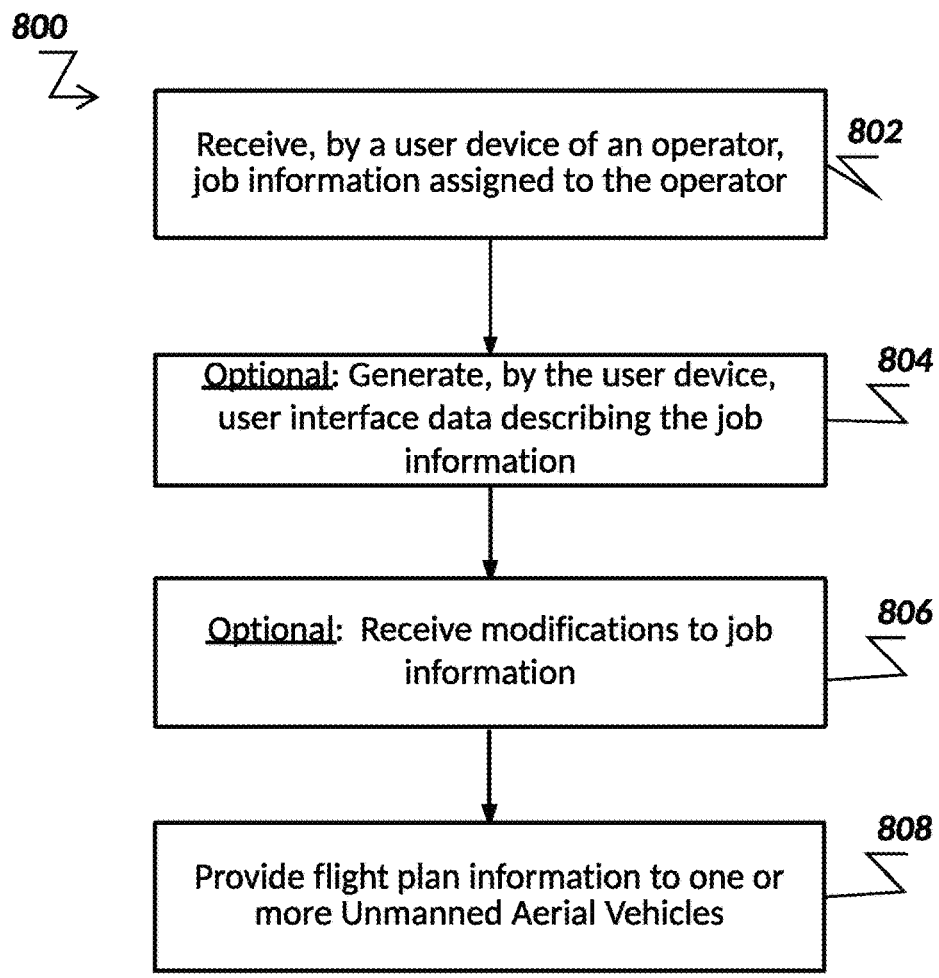
FIG. 8 is a flowchart of an example process for providing flight plan information to an unmanned aerial vehicle (UAV).

FIG. 8 is a flowchart of an example process 800 for providing flight plan information to an unmanned aerial vehicle (UAV). For convenience, the process 800 will be described as being performed by a user device of one or more processors (e.g., the user device 220).

The user device receives job information assigned to an operator of the user device (block 802), and the user device optionally provides user interface data describing one or more jobs (block 804). For example, the user device can present a map of an area that includes waypoints associated with each assigned job. Additionally, the user device can receive input (e.g., a pinch-to-zoom), and can present detailed information associated with particular jobs. For example, the operator can select (e.g., double tap, tap with greater than a threshold force or pressure, zoom in on) a particular waypoint, and the user device can present the detailed information. Detailed information can include an overview of a flight plan, such as waypoints that a UAV is to follow (e.g., waypoints from a corner of a rooftop to an opposite corner, including actions to be taken at waypoints or between waypoints), geofence boundary (e.g., property boundary), and so on. The user device can optionally receive modifications to a flight plan (block 806), for example as described above the operator can modify, or set, a starting/launch location, change waypoints, indicate obstacles that the UAV is to avoid, and so on. The user device can then provide a flight plan to the UAV for implementation (block 808). The UAV can then implement the flight plan, for example according to the UAV architecture described below.

FIG. 9 illustrates an example user interface 900 describing a job to inspect a particular property. As illustrated, the user interface 900 includes a representation of the property (e.g., house 902), along with a geofence boundary (e.g., boundary connected by 904A-904E), flight pattern (e.g., flight pattern over rooftop 906), launch/landing locations (e.g., location 910), and so on. An operator utilizing the user interface 900 can select layers 908 to be presented in the user interface 900, such as solely presenting the geofence boundary, inspection area (e.g., rooftop 906), and so on.

Figure 10:
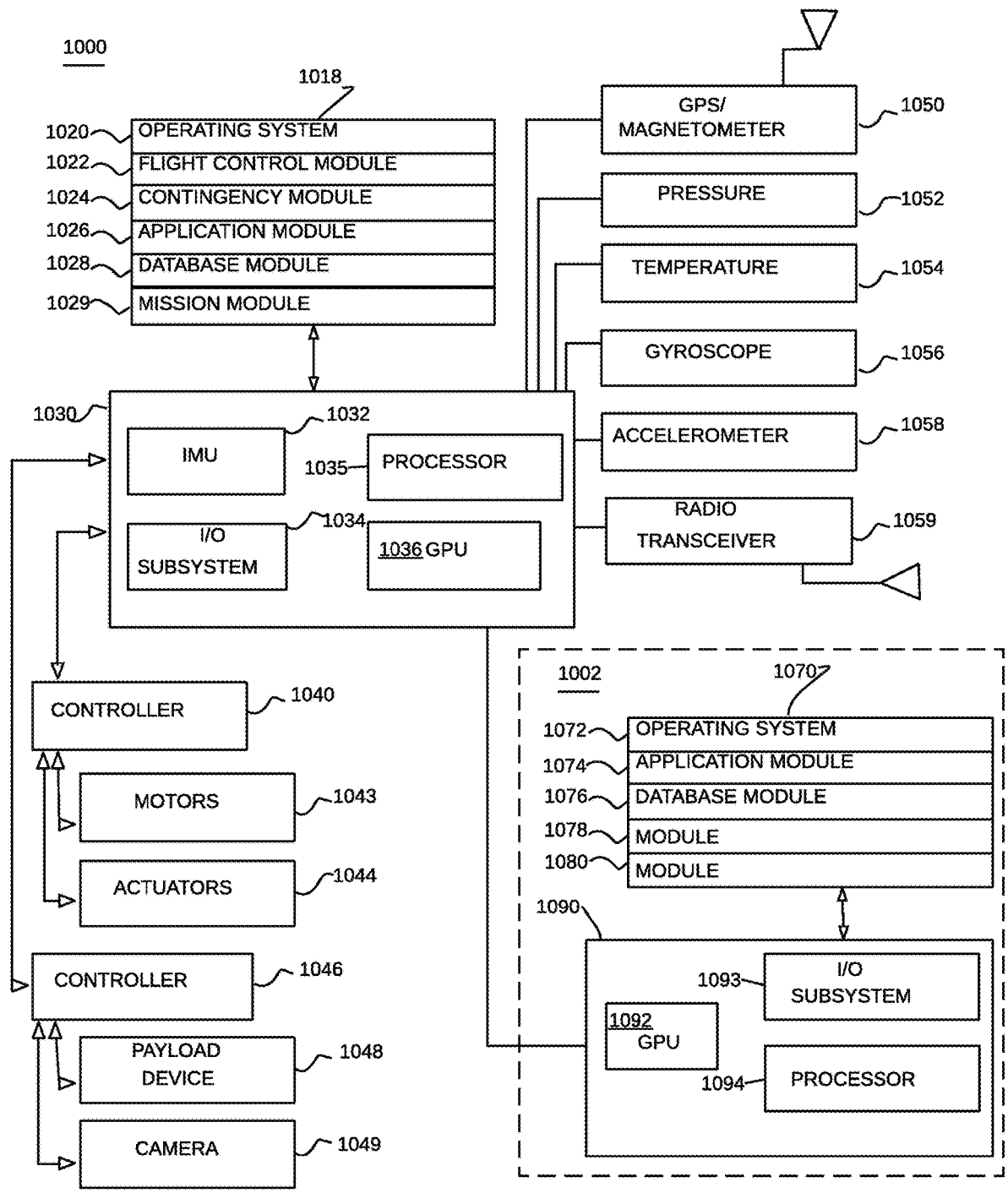
FIG. 10 illustrates a block diagram of an example Unmanned Aerial Vehicle (UAV) architecture for implementing the features and processes described herein.

FIG. 10 illustrates a block diagram of an example Unmanned Aerial Vehicle (UAV) architecture for implementing the features and processes described herein. A UAV primary processing system 1000 can be a system of one or more computers, or software executing on a system of one or more computers, which is in communication with, or maintains, one or more databases. The UAV primary processing system 1000 can be a system of one or more processors 1035, graphics processors 1036, I/O subsystem 1034, logic circuits, analog circuits, associated volatile and/or non-volatile memory, associated input/output data ports, power ports, etc., and/or one or more software processing executing one or more processors or computers. Memory 1018 may include non-volatile memory, such as one or more magnetic disk storage devices, solid state hard drives, or flash memory. Other volatile memory such a RAM, DRAM, SRAM may be used for temporary storage of data while the UAV is operational. Databases may store information describing UAV flight operations, flight plans, contingency events, geofence information, component information, and other information.

The UAV processing system may be coupled to one or more sensors, such as GPS receivers 1050, gyroscopes 1056, accelerometers 1058, pressure sensors (static or differential) 1052, current sensors, voltage sensors, magnetometer, hydrometer, and motor sensors. The UAV may use an inertial measurement unit (IMU) 1032 for use in navigation of the UAV. Sensors can be coupled to the processing system, or to controller boards coupled to the UAV processing system. One or more communication buses, such as a CAN bus, or signal lines, may couple the various sensor and components.

Various sensors, devices, firmware and other systems may be interconnected to support multiple functions and operations of the UAV. For example, the UAV primary processing system 1000 may use various sensors to determine the vehicle's current geo-spatial location, attitude, altitude, velocity, direction, pitch, roll, yaw and/or airspeed and to pilot the vehicle along a specified route and/or to a specified location and/or to control the vehicle's attitude, velocity, altitude, and/or airspeed (optionally even when not navigating the vehicle along a specific path or to a specific location).

The flight control module 1022 handles flight control operations of the UAV. The module interacts with one or more controllers 1040 that control operation of motors 1042 and/or actuators 1044. For example, the motors may be used for rotation of propellers, and the actuators may be used for flight surface control such as ailerons, rudders, flaps, landing gear, and parachute deployment.

The contingency module 1024 monitors and handles contingency events. For example, the contingency module may detect that the UAV has crossed a border of a geofence, and then instruct the flight control module to return to a predetermined landing location. Other contingency criteria may be the detection of a low battery or fuel state, or malfunctioning of an onboard sensor, motor, or a deviation from the flight plan. The foregoing is not meant to be limiting, as other contingency events may be detected. In some instances, if equipped on the UAV, a parachute may be deployed if the motors or actuators fail.

The mission module 1029 processes the flight plan, waypoints, and other associated information with the flight plan as provided to the UAV in the flight package. The mission module 1029 works in conjunction with the flight control module. For example, the mission module may send information concerning the flight plan to the flight control module, for example lat/long waypoints, altitude, flight velocity, so that the flight control module can autopilot the UAV.

The UAV may have various devices connected to it for data collection. For example, photographic camera 1049, video cameras, infra-red camera, multispectral camera, and Lidar, radio transceiver, sonar, TCAS (traffic collision avoidance system). Data collected by the devices may be stored on the device collecting the data, or the data may be stored on non-volatile memory 1018 of the UAV processing system 1000.

The UAV processing system 1000 may be coupled to various radios, and transmitters 1059 for manual control of the UAV, and for wireless or wired data transmission to and from the UAV primary processing system 1000, and optionally the UAV secondary processing system 1002. The UAV may use one or more communications subsystems, such as a wireless communication or wired subsystem, to facilitate communication to and from the UAV. Wireless communication subsystems may include radio transceivers, and infra-red, optical ultrasonic, electromagnetic devices. Wired communication systems may include ports such as Ethernet, USB ports, serial ports, or other types of port to establish a wired connection to the UAV with other devices, such as a ground control system, flight planning system, or other devices, for example a mobile phone, tablet, personal computer, display monitor, other network-enabled devices. The UAV may use a light-weight tethered wire to a ground control station for communication with the UAV. The tethered wire may be removeably affixed to the UAV, for example via a magnetic coupler.

Flight data logs may be generated by reading various information from the UAV sensors and operating system and storing the information in non-volatile memory. The data logs may include a combination of various data, such as time, altitude, heading, ambient temperature, processor temperatures, pressure, battery level, fuel level, absolute or relative position, GPS coordinates, pitch, roll, yaw, ground speed, humidity level, velocity, acceleration, contingency information. This foregoing is not meant to be limiting, and other data may be captured and stored in the flight data logs. The flight data logs may be stored on a removable media and the media installed onto the ground control system. Alternatively, the data logs may be wirelessly transmitted to the ground control system or to the flight planning system.

Modules, programs or instructions for performing flight operations, contingency maneuvers, and other functions may be performed with the operating system. In some implementations, the operating system 120 can be a real time operating system (RTOS), UNIX, LINUX, OS X, WINDOWS, ANDROID or other operating system. Additionally, other software modules and applications may run on the operating system, such as a flight control module 1022, contingency module 1024, application module 1026, and database module 1028. Typically flight critical functions will be performed using the UAV processing system 1000. Operating system 1020 may include instructions for handling basic system services and for performing hardware dependent tasks.

In addition to the UAV primary processing system 1000, a secondary processing system 1002 may be used to run another operating system to perform other functions. A UAV secondary processing system 1002 can be a system of one or more computers, or software executing on a system of one or more computers, which is in communication with, or maintains, one or more databases. The UAV secondary processing system 1002 can be a system of one or more processors 1094, graphics processors 1092, I/O subsystem 1094 logic circuits, analog circuits, associated volatile and/or non-volatile memory, associated input/output data ports, power ports, etc., and/or one or more software processing executing one or more processors or computers. Memory 1070 may include non-volatile memory, such as one or more magnetic disk storage devices, solid state hard drives, flash memory. Other volatile memory such a RAM, DRAM, SRAM may be used for storage of data while the UAV is operational.

Ideally modules, applications and other functions running on the secondary processing system 1002 will be non-critical functions in nature. That is, if the function fails, the UAV will still be able to safely operate. In some implementations, the operating system 1072 can be based on real time operating system (RTOS), UNIX, LINUX, OS X, WINDOWS, ANDROID or other operating system. Additionally, other software modules and applications may run on the operating system 1072, such as an application module 1074, database module 1076. Operating system 1002 may include instructions for handling basic system services and for performing hardware dependent tasks.

Also, controllers 1046 may be used to interact and operate a payload device 1048, and other devices such as photographic camera 1049, video camera, infra-red camera, multispectral camera, stereo camera pair, Lidar, radio transceiver, sonar, laser ranger, altimeter, TCAS (traffic collision avoidance system), ADS-B (Automatic dependent surveillance-broadcast) transponder. Optionally, the secondary processing system 1002 may have coupled controllers to control payload devices.

Each of the processes, methods, instructions, applications and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage. Electronic data sources can include databases, volatile/non-volatile memory, and any memory system or subsystem that maintains information.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While certain example embodiments have been described, these embodiments have been presented by way of example only, and are not intended to limit the scope of the disclosure. Nothing in the description is intended to imply that any particular element, feature, characteristic, step, module, or block is necessary or indispensable. The novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of the disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method, comprising:
    identifying a property for inspection based on a weather event impacting the property;
    determining a flight plan usable by an unmanned aerial vehicle (UAV) in identifying an extent of damage to the property caused by the weather event;
    presenting, at a user device, a user interface comprising user interface controls configured for toggling layers of the user interface, the layers comprising a first layer that includes a geofence, a second layer that includes an inspection area of the property, a third layer that includes at least one of a launch location or a landing location of the UAV, and a fourth layer that includes a base map layer of an area that includes the property; and
    receiving, via the user interface, a modification to the flight plan,
        wherein the modification includes an instruction to obtain sensor data related to another property adjacent to the property by pointing a sensor of the UAV towards the other property.

2. The method of claim 1, wherein receiving the modification to the flight plan comprises:
    receiving a modification to the at least one of the launch location or the landing location of the UAV.

3. The method of claim 1, wherein receiving the modification to the flight plan comprises:
    receiving a modification to the flight plan that includes at least one of a modification to a first action of the UAV at a waypoint of the flight plan or a second action of the UAV between waypoints of the flight plan.

4. The method of claim 3, wherein the modification to the flight plan comprises an instruction to activate a sensor of the UAV at the waypoint.

5. The method of claim 1, wherein the modification to the flight plan comprises an indication of an obstacle to be avoided by the UAV.

6. The method of claim 1, wherein the user interface comprises properties shaded based on respective determined levels of damage caused by the weather event.

7. The method of claim 6, further comprising:
receiving, via the user interface and with respect to one of the properties, an assignment of whether the one of the properties has evident damage, has indications of damage, or has no damage.

8. The method of claim 6, further comprising:
receiving, from the user device and via the user interface, a modification to a shading of one of the properties.

9. A system, comprising:
one or more memories; and
one or more processors, the one or more processors configured to execute instructions stored in the one or more memories to:
identify, based on aerial images, a property for inspection;
determine a flight plan usable by an unmanned aerial vehicle (UAV) in identifying an extent of damage to the property caused by a weather event;
present, at a user device, a user interface comprising user interface controls configured for toggling layers of the user interface, the layers comprising at least two of a first layer that includes a geofence, a second layer that includes an inspection area of the property, a third layer that includes one of a launch location or a landing location of the UAV, or a fourth layer that includes a base map layer of an area that includes the property; and
receive, from the user device, a modification to the flight plan,
wherein the modification includes an instruction to obtain sensor data related to another property adjacent to the property by pointing a sensor of the UAV towards the other property.

10. The system of claim 9, wherein the weather event is a hail storm and the flight plan includes utilizing a heat sensor of the UAV to determine whether portions of a rooftop of the property are leaking heat.

11. The system of claim 9, wherein the one or more processors are configured to execute instructions stored in the one or more memories to:
configure the flight plan such that the UAV obtains inspection data of a solar cell of the property, wherein the inspection data are usable in determining whether a reduction in an efficiency of the solar cell is caused by the weather event.

12. The system of claim 11, wherein the one or more processors are configured to execute instructions stored in the one or more memories to:
configure the flight plan to obtain inspection data of the solar cell in response to determining that the weather event is one of a hail storm, a tornado, or an earthquake.

13. The system of claim 9, wherein the property is identified for inspection based on an initial inspection performed by a fixed-wing UAV.

14. The system of claim 9, wherein the property is identified for inspection based on a textual instruction received from a person associated with property indicating that the inspection is to be performed.

15. The system of claim 9, wherein the property is identified for inspection based on respective responses from persons associated with other properties in an area that includes the property.

16. A non-transitory computer readable medium storing instructions operable to cause one or more processors to perform operations comprising to:
identify a property for inspection based on aerial images;
determine a flight plan usable by an unmanned aerial vehicle (UAV) in identifying an extent of damage to the property;
present, at a user device, layers relating to the property, the layers comprising at least three of a first layer that includes a geofence, a second layer that includes an inspection area of the property, a third layer that includes one of a launch location or a landing location of the UAV, or a fourth layer that includes a base map layer of an area that includes the property; and
receive, from the user device, a modification to the flight plan, wherein the modification includes an instruction to obtain sensor data related to another property adjacent to the property by pointing a sensor of the UAV towards the other property.

17. The non-transitory computer readable medium of claim 16, wherein the one or more processors are further configured to perform operations to:
include instructions in the flight plan for obtaining inspection data of a solar cell of the property, wherein the inspection data are usable in determining whether a reduction in efficiency of the solar cell is caused by a weather event.

18. The non-transitory computer readable medium of claim 16, wherein the property is identified for inspection based on an initial inspection performed by a fixed-wing UAV.

19. A system, comprising:
one or more memories; and
one or more processors, the one or more processors configured to execute instructions stored in the one or more memories to:
identify, based on aerial images, a property for inspection;
determine a flight plan usable by an unmanned aerial vehicle (UAV) in identifying an extent of damage to the property caused by a weather event,
wherein the weather event is a high-wind weather event and the property is identified for inspection in response to determining that the property is a wooden property;
present, at a user device, a user interface comprising user interface controls configured for toggling layers of the user interface, the layers comprising at least two of a first layer that includes a geofence, a second layer that includes an inspection area of the property, a third layer that includes one of a launch location or a landing location of the UAV, or a fourth layer that includes a base map layer of an area that includes the property; and
receive, from the user device, a modification to the flight plan.

20. The system of claim 19, wherein the property is identified for inspection based on an initial inspection performed by a fixed-wing UAV.

21. The system of claim 19, wherein the property is identified for inspection based on a textual instruction received from a person associated with property indicating that the inspection is to be performed.

22. The system of claim 19, wherein the property is identified for inspection based on respective responses from persons associated with other properties in an area that includes the property.

23. A method, comprising:
identifying a property for inspection based on a weather event impacting the property;
determining a flight plan usable by an unmanned aerial vehicle (UAV) in identifying an extent of damage to the property caused by the weather event,
wherein the weather event is a high-wind weather event and the property is identified for inspection in response to a determination that the property is a wooden property;
presenting, at a user device, a user interface comprising user interface controls configured for toggling layers of the user interface, the layers comprising a first layer that includes a geofence, a second layer that includes an inspection area of the property, a third layer that includes at least one of a launch location or a landing location of the UAV, and a fourth layer that includes a base map layer of an area that includes the property; and
receiving, via the user interface, a modification to the flight plan.

24. The method of claim 23, wherein receiving the modification to the flight plan comprises:
receiving a modification to the at least one of the launch location or the landing location of the UAV.

25. The method of claim 23, wherein receiving the modification to the flight plan comprises:
receiving a modification to the flight plan that includes at least one of a modification to a first action of the UAV at a waypoint of the flight plan or a second action of the UAV between waypoints of the flight plan.

26. The method of claim 25, wherein the modification to the flight plan comprises an instruction to activate a sensor of the UAV at the waypoint.

27. The method of claim 23, wherein the modification to the flight plan comprises an indication of an obstacle to be avoided by the UAV.

28. The method of claim 23, wherein the user interface comprises properties shaded based on respective determined levels of damage caused by the weather event.

29. The method of claim 28, further comprising:
receiving, via the user interface and with respect to one of the properties, an assignment of whether the one of the properties has evident damage, has indications of damage, or has no damage.

30. The method of claim 28, further comprising:
receiving, from the user device and via the user interface, a modification to a shading of one of the properties.

* * * * *